United States Patent [19]

Reid

[11] Patent Number: 4,643,830
[45] Date of Patent: * Feb. 17, 1987

[54] PROCESS FOR OPERATING A TOTAL BARRIER OXIDATION DITCH

[76] Inventor: John H. Reid, 7 Stansbury Ct., Fredericksburg, Va. 22401

[*] Notice: The portion of the term of this patent subsequent to Jul. 14, 1999 has been disclaimed.

[21] Appl. No.: 621,740

[22] Filed: Jun. 18, 1984

Related U.S. Application Data

[63] Continuation-in-part of Ser. No. 355,150, Mar. 5, 1982, Pat. No. 4,460,471, which is a continuation of Ser. No. 848,705, Nov. 4, 1977, abandoned, which is a continuation-in-part of Ser. No. 649,995, Jan. 19, 1976, abandoned.

[51] Int. Cl.[4] .................................................. C02F 3/20
[52] U.S. Cl. ...................................... 210/629; 210/630; 210/903; 210/926; 210/194; 210/219
[58] Field of Search ............... 210/926, 629, 630, 628, 210/194, 220, 620, 621, 626, 627, 219, 320, 903; 261/91, 93, 124, 36 R

[56] References Cited

U.S. PATENT DOCUMENTS

| | | |
|---|---|---|
| 1,247,542 | 11/1917 | Jones . |
| 1,643,273 | 8/1924 | Imhoff . |
| 3,421,626 | 1/1969 | Schramm et al. .................. 210/214 |
| 3,452,873 | 7/1969 | Blough ................................ 210/219 |
| 3,510,110 | 5/1970 | Klein .................................. 259/107 |
| 3,579,439 | 5/1971 | Meiring et al. ....................... 210/5 |
| 3,643,403 | 2/1972 | Speece ................................. 55/53 |
| 3,759,495 | 9/1973 | Boler et al. ......................... 261/92 |
| 3,760,946 | 9/1973 | Boler et al. ......................... 210/152 |
| 3,839,198 | 10/1974 | Shelef ................................. 210/14 |
| 3,846,292 | 11/1974 | Lecompte, Jr. ..................... 210/14 |
| 3,897,000 | 7/1975 | Mandt ................................. 239/177 |
| 3,900,394 | 8/1975 | Rongved .............................. 210/7 |
| 3,905,904 | 9/1975 | Cherne et al. ..................... 210/195 |
| 3,990,974 | 11/1976 | Sullins ................................ 210/96 |
| 4,138,328 | 2/1979 | Schnitzler ........................... 210/7 |
| 4,146,478 | 3/1979 | Rongved ............................ 210/195 |
| 4,159,243 | 6/1979 | Okey ................................... 210/14 |
| 4,199,452 | 4/1980 | Mandt ................................. 210/104 |
| 4,260,486 | 4/1981 | Reid .................................... 210/96.1 |
| 4,269,709 | 5/1981 | Rongved .......................... 210/195.3 |
| 4,278,547 | 7/1981 | Reid .................................... 210/629 |
| 4,285,818 | 8/1981 | Muskat ............................... 210/614 |
| 4,303,516 | 12/1981 | Stensel et al. .................... 210/154.4 |
| 4,324,655 | 4/1982 | Muskat ............................... 210/96.1 |
| 4,455,232 | 6/1984 | Reid .................................... 210/628 |
| 4,460,471 | 7/1984 | Reid .................................... 210/926 |

FOREIGN PATENT DOCUMENTS

| | | |
|---|---|---|
| 339224 | 10/1977 | Austria . |
| 2300373 | 7/1973 | Fed. Rep. of Germany ...... 176/210 |
| 166160 | 8/1974 | Hungary . |
| 87500 | 1/1958 | Netherlands . |
| 502119 | 3/1971 | Switzerland ....................... 176/210 |
| 729 | of 1914 | United Kingdom ............... 210/926 |
| 796438 | 6/1958 | United Kingdom . |

*Primary Examiner*—Benoît Castel
*Attorney, Agent, or Firm*—Marion Lelong

[57] ABSTRACT

A process for operating a total barrier oxidation ditch to provide concentrated power input per unit volume of the downwardly pumped liquor-air mixture and high mixing turbulence at maximum contact depth and hydrostatic pressure.

22 Claims, 22 Drawing Figures

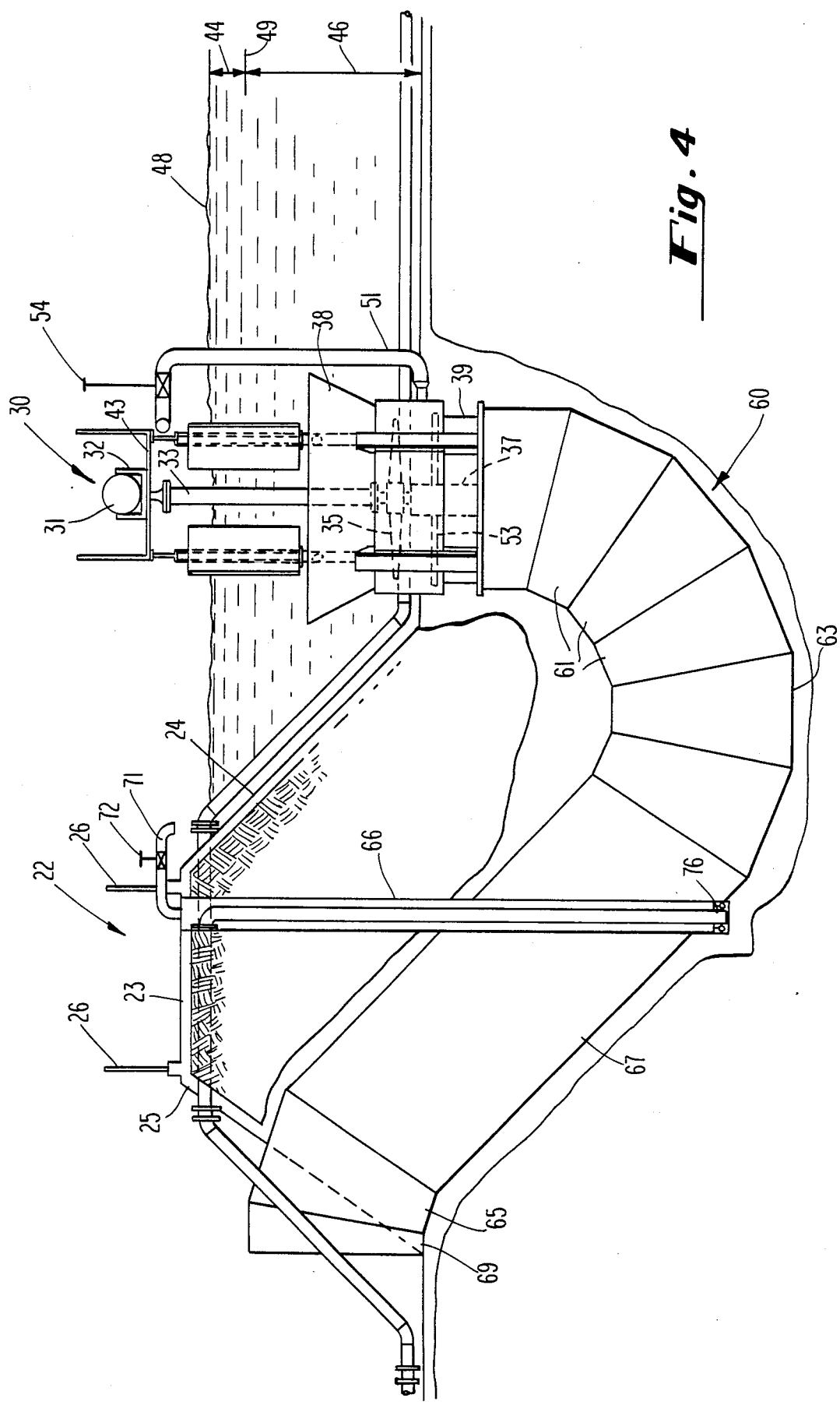

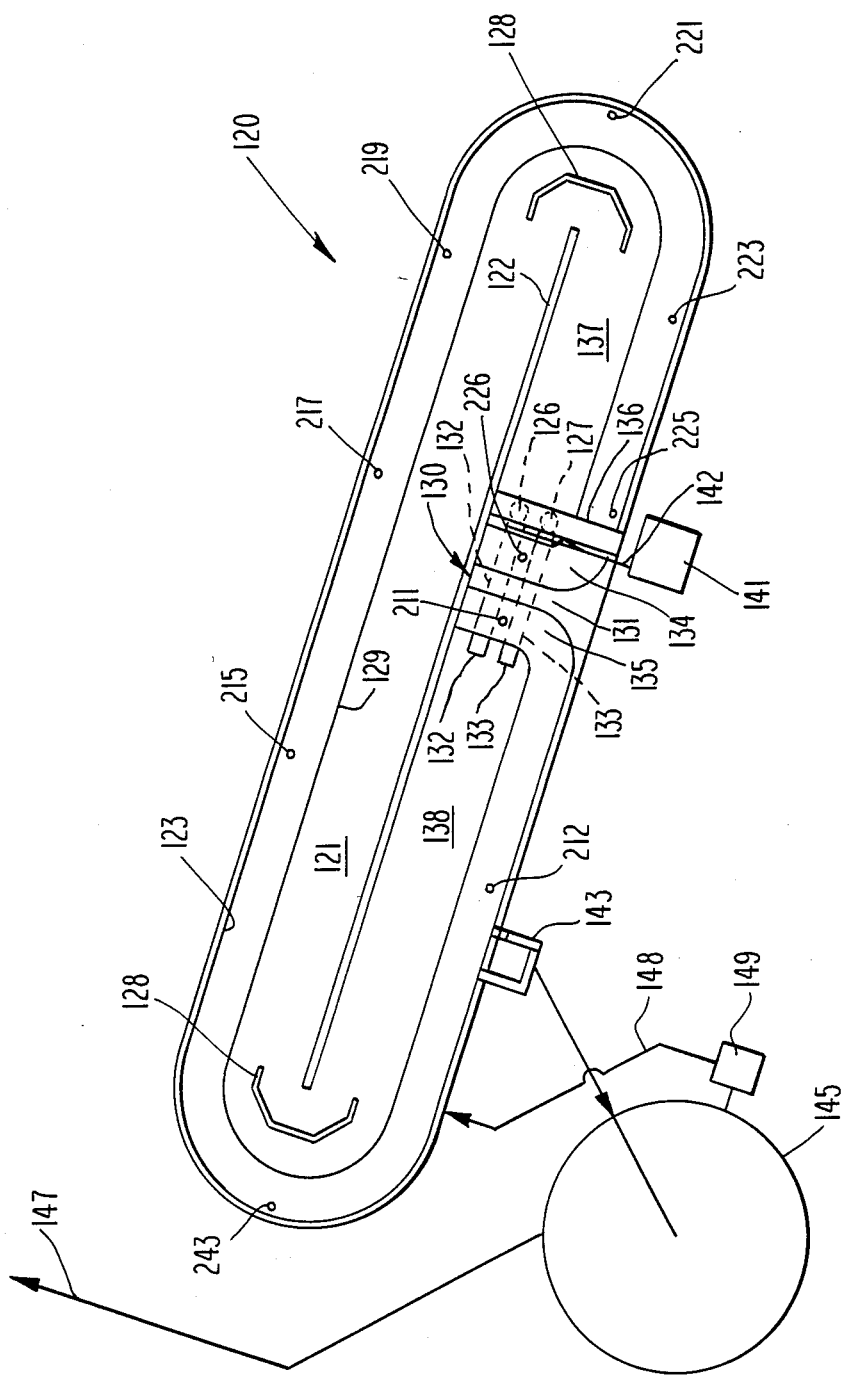

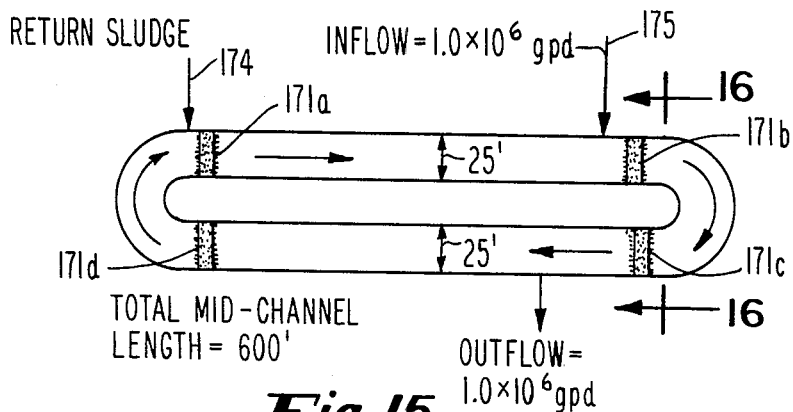
*Fig. 15*
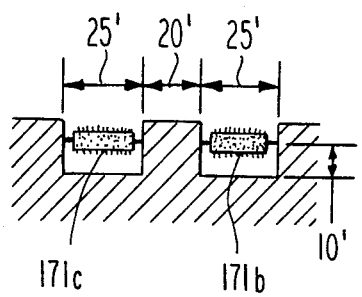
*Fig. 16*
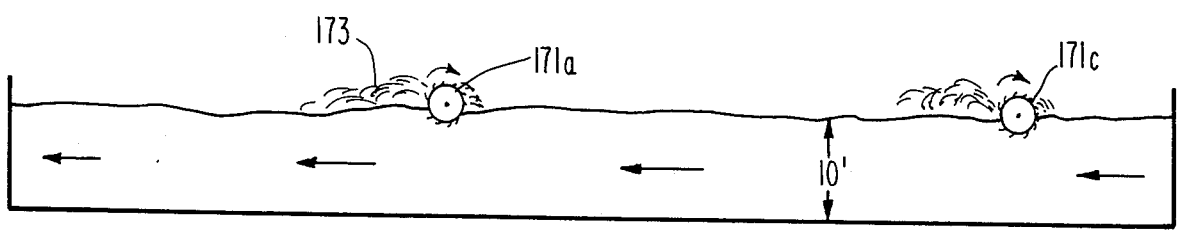
*Fig. 17*
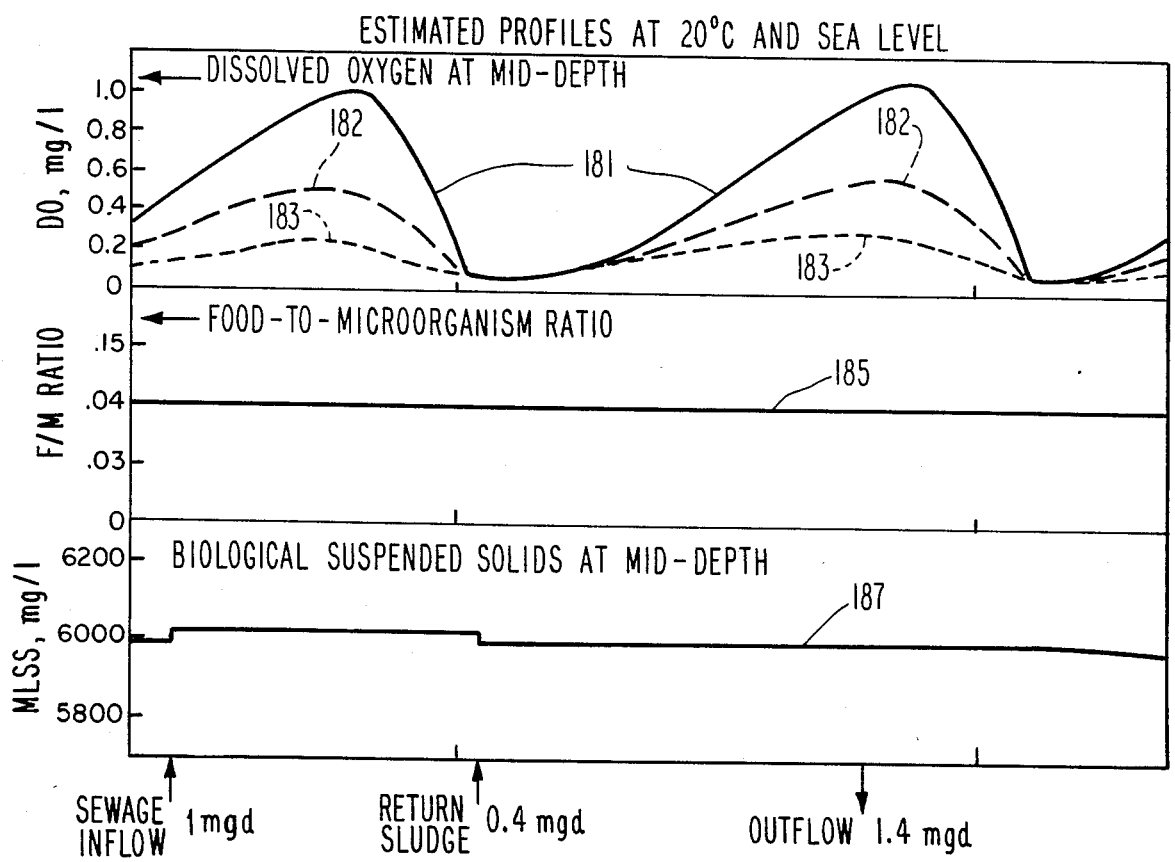
*Fig. 18* OXIDATION DITCH WITH 2 ROTOR AERATORS
ESTIMATED PROFILES AT 20°C AND SEA LEVEL

PROCESS FOR OPERATING A TOTAL BARRIER OXIDATION DITCH

CROSS REFERENCE TO RELATED APPLICATIONS

This application is a continuation-in-part of Ser. No. 355,150, filed Mar. 5, 1982, entitled "Flow Control Apparatus and Process for an Oxidation Ditch", now U.S. Pat. No. 4,460,471, which is a continuation of U.S. Ser. No. 848,705, filed Nov. 4, 1977, now abandoned, which is a continuation-in-part of U.S. Ser. No. 649,995, filed Jan. 19, 1976, entitled "Flow Control Apparatus and Method for Aerobic Sewage Treatment", now abandoned.

BACKGROUND OF THE INVENTION

1. Field of the Invention

This invention relates to the activated sludge process of wastewater treatment. The invention especially relates to methods and apparatuses for aerating and mixing in activated sludge processes which are conducted in closed loop reactors, such as oxidation ditches.

2. Review of the Prior Art

Many liquid waste treatment processes, commonly termed aerobic processes, supply bacteria and other microorganisms with dissolved oxygen for treating aqueous wastes such as municipal sewage, tannery wastes, dairy wastes, meat-processing wastes, and the like.

One such aerobic process is the activated sludge process, in which the microorganisms are concentrated as an activated sludge to be mixed with incoming wastewater, which supplies food for the organisms. The apparatuses in which the activated sludge process is conducted comprise an aeration basin (reactor basin) and a final clarifier (settling tank). The aeration basin serves as a culturing basin in which to generate the growth of bacteria, protozoa, and other types of microorganisms, so that they can consume the pollutants in the raw waste entering the basin by converting the pollutants into energy, carbon dioxide, water, and cells (biomass).

The activated sludge process is effective for controlling this conversion activity within the aeration basin, for settling the biomass within the clarifier, for overflowing the purified liquor or effluent from the clarifier to discharge, and for returning the settled biomass from the clarifier to the aeration basin. Thus, the activated sludge process is a suspended growth, aerobic, biological treatment process, using an aeration basin and a settling tank, which is capable of producing very pure, high quality effluent, as long as the biomass settles properly.

It can thus be compared to a fixed-growth process wherein the growth of the biomass occurs in a trickling filter on plastic media, redwood slat media, or rocks packed therewithin.

Objectives of aerobic wastewater treatment with the activated sludge process include biochemical oxygen demand (BOD) removal, phosphorus removal, $NH_3$-Nitrogen removal (preferably by nitrification, in which $NH_3$ is converted to $NO_2$ and $NO_3$ ions), $NO_3$-Nitrogen removal (preferably by denitrification, in which $NO_2$ and $NO_3$ ions are utilized as oxygen sources and the incoming waste as a carbon and energy source), minimum usage of chemicals and energy, and minimum manpower requirements.

The activated sludge process is represented by two prime mixing regimes, plug flow and complete mixing, which represent the opposite extremes of a continuum and almost infinite variety of intermediate mixing modes.

Plug flow mixing characteristically occurs in a long, narrow aeration basin into which wastewater and return sludge are fed at the inlet end to form a dilute mixed liquor which flows toward the outlet end while oxygen is being introduced and the biomass is rapidly increasing. At the outlet end, the mixed liquor passes to a clarifier. A portion of the recovered sludge, as clarifier underflow, is pumped to the inlet end. Plug flow systems are characterized by gradients in dissolved oxygen (D.O.) concentration and oxygen uptake rate of their mixed liquor which is inherently dominated volumetrically by the inflowing wastewater so that temporary or cyclic variations in wastewater characteristics, such as unusually large quantities of materials poisonous to microorganisms, can cause shock loadings that can at least temporarily inactivate the system. There are many hybrid systems (semi-plug flow) in which the waste and/or sludge are admitted at intervals along the channel.

Complete mixing is commonly conducted in a round or square basin into which incoming wastes are fed at numerous places while the contents are being vigorously mixed and aerated so that the wastes are rapidly dispersed throughout the tank. The volume of mixed liquor is so much greater than the volume of the incoming wastewater that the mixed liquor overwhelmingly dominates the wastewater. Theoretically, in the complex mix basin, the basin mixed liquor suspended solids concentration, dissolved oxygen concentration, and oxygen uptake rate are uniform at all points.

Thus there is a relatively uniform food/microorganism (F/M) ratio existing in such complete-mix tanks, as contrasted with the variable ratio that occurs in the plug flow and semi-plug flow tanks.

Both plug flow mixing conditions, in which a dissolved oxygen concentration gradient occurs, and complete mixing conditions, in which uniform oxygen uptake rate, mixed liquor suspended solids concentration, and F/M ratios occur, exist simultaneously within single-stage activated sludge systems, commonly termed closed loop reactors or oxidation ditches, which have an endless channel within which the numerous species of microorganisms in its mixed liquor go through aerobic and anoxic synthesis, aerobic and anoxic endogenous respiration, and resting cycles totaling 3-20 minutes, depending upon channel length, temperature, flow velocity, food supply, and the like. The biomass in the mixed liquor is maintained at a high level of abundancy (such as 3,000-10,000 mg/l), so that oxygen tends to be quickly consumed within the aerobic portion of the channel.

These microorganisms in circuit flow within the endless channels of oxidation ditches can also be supplied with sufficient oxygen within the aerobic portion that nitrite and nitrate ions can be formed from ammonia, which is derived from broken-down proteins, and then can be sufficiently deprived of oxygen during a second portion of the cyclic flow that the nitrite ions and nitrate ions and/or sulfate ions are used as oxygen sources by certain species of microorganisms, provided that a carbon-supplying food source, such as methanol, incoming wastewater, absorbed organic matter, or biomass cell carbon, is available. This process causes nitrogen to be liberated from the mixed liquor as bubbles of gas and is termed denitrification.

However, if temperature, biomass concentration, food supply, oxygen supply, and the like should change so that the aerobic portion of the endless channel is increased in length at the expense of the anoxic portion thereof (within which denitrification occurs), denitrification can continue while the withdrawn mixed liquor is being clarified. The unfortunate result is that nitrogen bubbles can rise within the clarifier and seriously interfere with settling of the biomass to form sludge and clarified liquor.

Aerators used in activated sludge systems include bubble diffusers, mechanical surface aerators (both high speed and low speed), submerged turbine aerators, horizontal rotors, and gas-liquid jet aerators, such as eddy jets. The horizontal rotors may be fixed, adjustable in height, or floating and may be fitted with brushes, blades, cages, or discs. "Submerged turbine aerator" is a term used in the wastewater treatment industry to describe a mixing device which comprises one or more axial-flow propellers or radial-flow impellers, in which compressed air or high-purity oxygen is diffused through the sparge device, located underneath the lower propeller or impeller which is attached to a vertically disposed shaft. The propeller may or may not be located within a vertically disposed discharge or intake duct.

Only vertically mounted low-speed mechanical surface aerators, horizontally mounted rotor aerators with brushes, blades, cages, or discs, and jet aerators had been usable in oxidation ditches until the invention of the barrier oxidation ditch, as disclosed in U.S. Ser. No. 649,995, filed Jan. 19, 1976, and in U.S. Ser. No. 848,705, filed Nov. 4, 1977, both of which are now abandoned and describe means for mounting and utilizing submerged turbine aerators within a deep oxidation ditch having a barrier athwart the channel, and both of which are incorporated herein by reference.

It is pertinent to note that a conventional circuit-flow oxidation ditch of the prior art operates as a complete mix system except that its D.O. gradient is characteristically plug flow. Circulation of the entire basin contents during each cycle, while admixing the mixed liquor with the relatively minor stream of inflowing wastewater, ensures such complete-mix conditions.

Although the racetrack or looped channel could be extended to a mile in length, for example, whereby the circuit flow in its channel would be comparable to that of the inflowing wastewater in volume, such as 1:1 or 3:1, thereby simulating a true plug flow activated-sludge system, the process would then be subject to shock-load effects, the food-to-microorganism ratio in the waste inlet portion being so high that the microorganisms could readily be overwhelmed by incoming poisons or other changes in the food situation. Therefore, an oxidation ditch must be sufficiently short that its channel flow of mixed liquor is ample to dilute the inflowing wastewater by volume ratios of 100:1 to 200:1 or greater, whereby the inflowing wastewater is completely dominated volumetrically by the mixed liquor in the ditch and the food-to-microorganism ratio is low enough that the microorganisms can handle any reasonable change in food properties, thereby simulating a true complete mix system, without being poisoned. In comparison, the dilution ditch for the fish pond in U.S. Pat. No. 1,643,273 of Imhoff teaches a dilution ratio of at least 3:1, but the ditch contains no mixed liquor.

At such desirable volume ratios, an oxidation ditch can be designed to operate with a food-to-microorganism ratio (F/M) by weight that varies over a possible range of 0.01 to 5.0, depending upon space, cost, and process design requirements, by varying the concentration of microorganisms, expressed as mixed liquor suspended solids (MLSS), flowing within its channel. If operating at a low F/M ratio of 0.01–0.2, it is an extended aeration system, producing small quantities of sludge. If operating at a medium F/M ratio of 0.2–0.5, it is a conventional system. If operating at a high F/M ratio of 0.5–2.5, it is a high-rate activated sludge system, producing large quantities of sludge. Moreover, it can even be operated as an aerated lagoon with no recycle sludge at F/M ratios above 2.5, but it is then not operating according to the activated sludge process and is, therefore, not herein defined as an oxidation ditch. After settled sewage has been diluted with pond water in the dilution ditch of U.S. Pat. No. 1,643,273, the F/M ratio is undoubtedly far greater than 2.5 because the microorganisms in the pond water are likely to be merely one twentieth of the minimum concentration thereof in the mixed liquor of a typical oxidation ditch.

An oxidation ditch may also shift through a wide F/M range, representing all three of these systems, as it begins operation as a high-rate activated sludge system, with no built-up sludge, and gradually builds up its recycled sludge to a mixed liquor suspended solids (MLSS) content of 3,000 mg/l where extended aeration can generally be considered to begin. In general, an oxidation ditch is considered for design purposes to exist when the MLSS content reaches about 1500 mg/l because at lower levels the size of the ditch would have to be excessive, but the principles of its operation are nevertheless applicable at much lower MLSS levels, such as at 1,000 mg/l. It may safely be said, however, that it is impossible to operate an oxidation ditch at such low MLSS levels ($\leq 100$ mg/l) as would exist in the dilution ditch of U.S. Pat. No. 1,643,273.

It is significant that increasing the concentration of the microorganisms increases the total amount of oxygen used in an oxidation ditch of given volume and necessitates a higher flow velocity to maintain the greater mass of solids in suspension. At a given rate of food inflow (F), increasing the concentration (M) of microorganisms obviously decreases the F/M ratio. A change in the F/M ratio also changes the $O_2$ transfer rate (measured as pounds of oxygen per hour at process conditions) for which the ditch must be designed, as is known in the art. For example, using F/M to represent food content as pounds of five-day biochemical oxygen demand, BOD(5), per pound of microorganisms, O/F to represent pounds of oxygen per pound of BOD(5), and O/M to represent pounds of oxygen per pound of microorganisms, the following approximate relationships are known in the art:

TABLE I

| Type of activated sludge process | Sludge age, days | Excess biological volatile Solids (cells) produced per lb. BOD(5) applied = ES | Typical MLSS content mg/l | F/M | O/F | O/M |
|---|---|---|---|---|---|---|
| High rate load | 0.5–2 | ES = 1 | 500–1000 | 1.0 | 0.7 | 0.7 |
| Conventional load | >2 <6 | 0.35<ES<1.0 | >1000 <3000 | 0.3 | 1.0 | 0.3 |
| Extended | >6 | 0.2<ES<0.35 | >3000 | 0.1 | 1.5 | 0.15 |

TABLE I-continued

| Type of activated sludge process | Sludge age, days | Excess biological volatile Solids (cells) produced per lb. BOD(5) applied = ES | Typical MLSS content mg/l | F/M | O/F | O/M |
|---|---|---|---|---|---|---|
| aeration | <20 | | <5000 | | | |
| Low load extended aeration (typical for oxidation ditch) | >12 | ES>0.2 | >3000 | 0.5 | 1.8 | 0.09 |

In order to remove nitrogen from a wastewater, in which it may be measured as total nitrogen or total Kjeldahl nitrogen, all systems using the wastewater as the chief organic carbon source for denitrification employ an alternating aerobic-anoxic sequence of stages, without intermediate clarification, to effect total nitrogen removal while attempting to avoid ammonia nitrogen bleedthrough. An oxidation ditch can be used for this purpose by controlling the level of aeration so that the mixed liquor is recirculated many times through alternating aerobic and anoxic zones prior to discharge from the channel of the ditch. To operate effectively, however, it is important that both zones be uninterrupted; i.e., aeration should occur at a single location immediately preceding the aerobic zone and should not recur until at least the end of the anoxic zone.

If aeration occurs at only one location, so that there follows downstream thereafter one and only one aerobic zone, one and only one anoxic zone, and, if desired, an oxygen-deficient zone within the channel of the ditch, it is herein defined as "point-source aeration". If there are multiple zones of each type, it is defined as "multi-source aeration".

"Point-source aeration", "point-source mixing", and "point-source propulsion" are terms signifying that these three properties (hereinafter generally termed "point-source treatment") each originate at a single location within the channel of an oxidation ditch, in contrast to multiple locations therefor.

A precursor of the oxidation ditch is described in U.S. Pat. No. 1,247,542 of Jones (1917). It has a race-track-shaped channel, a plurality of baffles disposed across the channel, and air diffusers on the downstream side of each baffle, thereby creating eddy-type flow between nearby baffles.

A system that is superficially similar in plan view is shown in U.S. Pat. No. 1,643,273 of Imhoff (1927). It comprises a pond in which fish may be raised, a ditch which is connected to the pond at each end, an inlet to the ditch for sewage which has passed through a settling basin, and a pump device in the ditch for withdrawing clean water from the pond so that it may dilute the settled sewage before it is fed to the pond. The pump device comprises a baffle which is disposed athwart the ditch, a passage beneath the baffle, and an airlift pump alongside the baffle so that its operation pulls the water through the passage. It does not utilize the activated sludge process because there is no mixed liquor in the ditch. Most of the oxygen transfer occurs by algae activity in the pond, and the intake D.O. content is generally high so that the pump is not intended to function primarily as an $O_2$ transfer device. In addition, because the pond itself functions as a barrier and as a large settling zone, there is no induced flow approaching the pump and no loss of momentum because of the baffle.

The first oxidation ditch was invented by Dr. Ir. A. Pasveer and is described in Netherlands Pat. No. 87,500 (1957) and British Pat. No. 796,438 (1958). The mixed liquor in its racetrack-shaped channel is aerated and propelled by a horizontally disposed brush-type rotor, which acts as a booster pump for the mixed liquor flowing therebeneath. Clarifying is performed intermittently within the channel.

An oxidation ditch of conventional shape, with a post-sedimentation reservoir or clarifier therewithin for sewage treatment is described in U.S. Pat. No. 3,421,626 of Schramm et al (1969). Two rotors are operated within the endless channel during dry weather. When excessive rainfall occurs, the rotors are stopped, and the channel of the oxidation ditch becomes a preliminary settling basin.

An oxidation ditch in which the mixed liquor is agitated, aerated, and propelled by a shrouded drum having rotor blades is described in U.S. Pat. No. 3,452,873 of Blough (1969) for disposing of livestock manure.

The Pasveer oxidation ditch was improved in Holland by deepening the ditch, separating the straight reaches of its endless channel with a thin partition, and installing a vertically mounted, low-speed mechanical surface aerator at an end of the partition, as disclosed in U.S. Pat. No. 3,510,110 of Klein (1970). Depths of up to 16 feet are feasible. A complete mix zone is created around the aerator, and booster-type pumping occurs when a portion of the toroidal flow strikes the partition and is converted into a slowly spiralling downstream flow. Clarification occurs continuously in a separate vessel, with a portion of the sludge being returned to the oxidation ditch. This system is marketed under the trademark "Carrousel".

A multichannel oxidation ditch, in which discs mounted on a common shaft act as pump/aerators for sewage treatment, is described in U.S. Pat. No. 3,579,439 of Meiring et al (1971). The mixed liquor flows sequentially from one concentrically disposed channel to the other. The channels can be operated for nitrification and denitrification by controlling the amount of flow between the channels and the settling tanks.

A pair of shallow U-shaped tanks are connected to form an oxidation ditch in Swiss Pat. No. 502,119 (1971), each tank having a longitudinally disposed suction tube, with its inlet near the bottom, and a rotor at the outlet of the tube and at the surface of the liquid, whereby the suction tubes cause the liquid to circulate.

An inverted funnel is suggested in U.S. Pat. No. 3,643,403 by Speece (1972) for aerating oxygen-deficient water by counter-current flow with ascending air bubbles.

An oxidation trench having a longitudinally disposed partition and a vertical discharge duct in the middle of the partition or at one or both of its ends, with the inlet of the duct being at the bottom of the partition and at one side thereof and the discharge duct and outlet at the other side, is described in German Pat. No. 2,300,373 (1973). A mechanical surface aerator is vertically mounted within the outlet. It provides merely one half of its propulsive force for use in the discharge channel in each direction of its pump/aerator which is disposed in the middle of the partition. It is, moreover, subject to short circuiting or backmixing if the pump/aerator is nearer to one end.

An elongated oxidation ditch of looped-channel configuration, in which the mixed liquor is circulated directly through the cooling condensers of an electric power generating plant by a single rotor equipped with discs, is described in U.S. Pat. No. 3,760,946 of Boler (1973).

An oxidation ditch of the looped-channel type which is used as a channeled algae pond, in which the liquid is propelled and agitated by a plurality of horizontally disposed cage aerators or aeration brushes, is described in U.S. Pat. No. 3,839,198 of Shelef (1974).

Circular and elongated oxidation ditches in which the mixed liquor is aerated and propelled by banks of jet ejectors are described in U.S. Pat. Nos. 3,846,292 of Lecompte, Jr. (1974); 3,897,000 of Mandt (1975); and 4,199,452 of Mandt (1980).

A denitrification process for use in oxidation ditches having a vertically mounted mechanical surface aerator at one or both ends of a longitudinally disposed partition is described in U.S. Pat. No. 3,900,394 of Rongved (1975).

An oxidation ditch utilizing the aeration rotor of U.S Pat. No. 3,759,495 of Boler et al (1973) is described in U.S. Pat. No. 3,905,904 of Cherne et al (1975).

An oxidation ditch which includes a bank of venturitype ejectors is described in U.S. Pat. No. 3,990,974 of Sullins (1976). A dissolved oxygen sensor controls pumping of liquor through the ejectors and thereby the quantity of air sucked from above the liquor level into the throats of the ejectors. Banks of vertical settler tubes are also disposed at one end of the oxidation ditch to effect settling of particles after impingement upon the inside surfaces of the tubes.

An oxidation ditch having a transversely disposed barrier across the channel is described in Hungarian Pat. No. 166,160 (1976) and Austrian Pat. No. 339,224 (1977), the barrier being traversed by a discharge duct containing a smaller duct within which an axial-flow impeller is disposed, whereby the smaller duct discharges within the larger one and functions as an upwardly discharging jet ejector because air bubbles are discharged from the blades of the impeller.

A pair of oxidation troughs, each equipped with a drum-type rotor, is connected in series with (1) an aerated buffer vessel to receive incoming waste, (2) an aerated high-capacity tank for mixing the pre-aerated waste with return sludge and for feeding the pair of oxidation troughs, and (3) a clarifier for receiving effluent from the troughs, as is described in U.S. Pat. No. 4,138,328 of Schnitlzer (1979).

A circular oxidation ditch having a spiral path and a return tunnel from its outermost loop to its center, where a propeller, brush, or paddle wheel rotating about a vertical axis throws and aerates liquid that has been pulled through the tunnel, is described in U.S. Pat. No. 4,146,478 of Rongved (1979).

An oxidation ditch utilizing surface aerators is disclosed in U.S. Pat. No. 4,159,243 of O'Key (1979). The disclosed oxygen concentration is measured at two or more points in the endless channel and the aerators are controlled accordingly to produce desired lengths of oxic and anoxic zones.

An oxidation ditch is taught in U.S. Pat. No. 4,269,709 of Rongved (1981). It comprises a surface aerator adjacent to one end of a dividing wall and a tilted partition attached to the same end for deflecting and accelerating the flow of liquor, whereby damage to flocs by destructive turbulence is minimized.

An oxidation ditch utilizing rotors for surface aeration of its mixed liquor is described in U.S. Pat. No. 4,285,818 of Muskat (1981). One rotor operates within a gas-tight cover having selectively operated flaps which are closed while oxygen is admitted after dissolved-oxygen probes have detected an undesirably low level of dissolved oxygen within the channel.

An oxidation ditch utilizing a surface aerator and having a clarifier disposed in the endless channel, so that the mixed liquor flows therebeneath, is described in U.S. Pat. No. 4,303,516 of Stensel et al (1981).

Oxygen of a higher concentration than atmospheric oxygen is controllably introduced within a cover over a portion of the channel of an oxidation ditch and is mixed with the liquor by a surface aerator, as described in U.S. Pat. No. 4,324,655 of Muskat (1982).

As of 1975, there were more than 500 municipal oxidation ditch installations of the horizontal rotor type in the United States and 90 in Canada, and there were 154 Carrousel installations in the world, according to "A Comparison of Oxidation Ditch Plants to Competing Processes for Secondary and Advanced Treatment of Municipal Wastes", by W. F. Ettlich, EPA-600/2-78-051, March 1978, National Technical Information Service, Springfield, Va., 22161. In this publication, these oxidation ditch plants are stated to provide flexibility in operation, a stable sludge, and performance above the average of all other competing secondary processes. Oxidation ditch plants were also found to be very competitive in operation and maintenance cost and to provide nitrogen removal at no additional cost.

However, these prior art oxidation ditches have many design and operational problems. Except for the jet ejector types, the pump/aerator devices of all prior art oxidation ditches are surface aerators. These devices produce spray and mist which create slippery walkways because of algae growth in summer and freezing in winter. They also cause excessive ice formation on the aeration equipment in the winter. Enhancing the surface area of liquor exposed to cold air by surface aeration further causes a loss of heat from the system and a reduction in reaction rates.

It is conventional practice in prior art oxidation ditches that their pump/aerators furiously aerate a portion of their liquor, while allowing the remainder to flow past untouched, and then the aerated and unaerated portions of the mixed liquor blend somewhere downstream of the pump/aerators to produce the desired dissolved oxygen content. From a hydraulic viewpoint, this practice can be termed "booster pumping", because the pump merely accelerates or adds energy to the mass of liquor flowing past the pump.

Such booster pumping seems to have developed because designers of prior art oxidation ditches have apparently believed that the kinetic energy in the induced-flow liquor is an asset that should not be interfered with. They have accordingly designed their ditches for booster pumping with single devices that combine the functions of pumping and aerating, whereby the momentum of the flowing liquor is merely augmented with each circuit-flow movement past the pump/aerator. Because the pumping function requires a relatively small input of energy, the principal capability of these devices is the aerating function. However, pumping and aerating functions cannot be utilized independently.

In consequence, a multi-component price has had to be paid for this value judgment as to the importance of kinetic energy. These price components can be enumerated as follows:

(a) Backpumping of some liquor occurs from the discharge side to the intake side of the pump/aerator, so that a portion of the liquor must be pumped more than once.

(b) Backpumping of mixed liquor causes backmixing of an aerated mixed liquor. The result is that this portion of the backpumped liquor which contains relatively high levels of dissolved oxygen must be aerated again, thereby wasting energy. In addition, because prior art systems are designed to aerate a fraction of the flow rather than all of it, when the backmixed liquor is being aerated a second time, the already aerated backmixed liquor is displacing an equal volume which cannot be aerated the first time.

(c) Heterogeneous aeration occurs when unaerated induced-flow liquor blends with highly aerated liquor to produce a blended downstream liquor having a desired average dissolved-oxygen content. Such heterogeneous aeration requires more energy than homogeneous aeration to the same dissolved-oxygen content because the same quantity of oxygen must be directly transferred, at a lower transfer rate, to a smaller volume of mixed liquor circulating in the oxidation ditch.

(d) Propulsion limitations occur when a portion of the liquor bypasses the pump/aerator, without being contacted or even directly influenced by the device, and is instead induced to flow by momentum. This induced-flow liquor is susceptible to being retarded whenever the frictional head, required to circulate a mixed liquor containing high MLSS concentrations around the oxidation ditch channel, becomes excessive. As a practical matter, such excessive friction is likely when attempting to operate an oxidation ditch at very high levels of MLSS of 6,000–10,000 mg/l since the liquid density and viscosity increase as the MLSS level increases.

(e) Inflexibility of operation occurs because the aerating and pumping functions of the pump/aerator are performed simultaneously by the same prior art device, whereby changing the submergence or the rotational speed of a pump/aerator simultaneously changes both the oxygen transfer rate and the oxidation ditch circulation velocity when it may be desirable to reduce oxygen transfer rate but not reduce oxidation ditch circulation velocity, for example.

(f) Aeration efficiency cannot be improved by increasing the driving force of oxygen transfer into the mixed liquor by using higher hydrostatic pressures selectively in the oxygen transfer zone of the oxidation ditch.

The inability to prevent backpumping of liquor from the discharge side toward the intake side of the aerator imposes some additional energy demands upon the system, while the inability to prevent backmixing of aerated mixed liquor with unaerated liquor is a much more serious cause of energy wastage. Backmixing reduces the amount of oxygen transferred into a given volume of mixed liquor circulating past or through a given size aerator per unit of time. Additional energy is required to transfer a certain amount of oxygen per unit time or to attain a desired D.O. content when backmixing occurs because the necessary driving force for transferring oxygen increases non-linearly as the dissolved-oxygen content increases, according to the equation:

$$(dC/dt) = K(C_s - C)$$

where, at a given temperature of oxygen transfer:
C = initial oxygen concentration,
t = time,
$C_s$ = saturation concentration of oxygen at the given temperature, and
K = the overall gas mass transfer coefficient (time$^{-1}$); it is a function of the resistance of the films and the area of liquid-gas interface per unit volume of liquid.

As may be appreciated from FIG. 1, the rate of oxygen transfer, from bubbles of an oxygen-containing gas, such as air, to water, is a tangent, dC, to the solubility curve plotted from this equation (for initially deaerated water at 4° C. and an atmospheric pressure of 14.54 psi) at any time, t. If unaerated water is being aerated, the initial slope is quite steep, such as line A in FIG. 1 (equalling 4.0 in the units as shown). If backmixing occurs so that a mixture of aerated and unaerated water is aerated, the slope is much shallower, such as line B in FIG. 1 (equalling 1.1). If heavily aerated water reaches the aeration device, the slope can be very shallow, such as line C in FIG. 1 (equalling 0.53). It should, therefore, be quite clear that, with a given input of energy, backmixing will cause a considerably smaller quantity of oxygen to be transferred into a given circulation flow of water, as compared to the situation for aeration of unaerated water. Designers of prior art oxidation ditches, complete mix systems, and plug flow systems appear to have ignored the high cost of backmixing and even its very existence.

The inability of prior art oxidation ditches to prevent heterogeneous aeration, which occurs when highly aerated mixed liquor is blended with unaerated liquor, is also believed to be important. As can be appreciated by a glance at FIG. 1, when a quantity of aerated liquor having an oxygen concentration of 13.6 mg/l and an oxygen transfer rate C, after cumulative aerating for 10 minutes, is blended with an equal quantity having an oxygen concentration of zero and an oxygen transfer rate A, at zero aerating time, to produce a mixture having an oxygen content of 6.8 mg/l and an average cumulative oxygen transfer rate D (equalling 1.9), an average cumulative time of 5.0 minutes is spent on the entire blend, i.e., more energy is expended than would be required for homogeneously aerating up to slope D at cumulative time equalling 2.7 minutes. Expressed in other terms, aerating the entire quantity at a starting D.O. of 0.0 mg $O_2$/l for 5.0 minutes imparts 9.9 mg/l to the liquid, equivalent to line B. The difference between 9.9 and 6.8 represents a significant energy wastage when using the curve shown in FIG. 1 which is characteristic of one type of pump/aerator, as an example.

The practical effect in a prior art oxidation ditch of both backmixing and heterogeneous aeration, in combination, may be appreciated by considering FIG. 2. The upper portion of this schematic flow chart relates to backmixing of aerated liquor to the aerator, and the lower portion relates to heterogeneous aeration which occurs when unaerated liquor flows past the aerator and blends with aerated liquor somewh.ere downstream of the aerator. The combined effect of these prior art process characteristics is to force the final aeration time, t, to shift a significant distance along the aeration curve for the liquor, as illustrated by moving from the relatively steep tangent D to the shallower tangent B or even to tangent C in FIG. 1.

Controllable amounts of heterogeneous blending are produced by barrier oxidation ditches having adjustable gateways in their barriers, as disclosed in U.S. Pat. No. 4,278,547 of J. H. Reid, which is incorporated herein by reference, in order to conserve momentum in the translationally flowing mixed liquor.

Propulsion limitations are often interrelated with equipment characteristics. For example, the vertically mounted low-speed mechanical surface aerators used in the Carrousel system cannot be mounted side by side and cannot be built to a size greater than 150 horsepower. In consequence, these pump/aerators must be mounted within a relatively narrow channel so that circulation capacity of the channel is limited. They are further limited as to deliverable head because liquor that is near the outer wall and near the bottom of the channel is not pumped but is induced to flow by momentum and by proximity to the pumped liquor. This induced-flow liquor is, therefore, susceptible to being retarded or held back if the frictional head is excessive such as can occur at high MLSS concentrations of more than 8,000 mg/l. In consequence, the Carrousel system has utilized a plurality of mechanical surface aerators at ends of partitions in a looped channel configuration, operating as booster pumps in series, for large oxidation ditches. The Carrousel system is presently marketed in the United States by Envirotech Corporation.

The horizontal-rotor oxidation ditches, equipped with blades, brushes, or cages, have difficulties with stratification at depths greater than seven feet, such difficulties including settling of suspended solids, oxygen depletion, and anaerobic digestion in bottom areas, unless a slanted baffle is mounted downstream from the rotor and athwart the channel to force pumped and aerated liquor toward the bottom. Although the baffle creates mixing at lower depths, the unaerated flow beneath the rotors is nevertheless induced flow, not pumped flow, and is subject to retardation if the friction head for circulation of mixed liquor around the oxidation ditch is excessive. However, such horizontal-rotor ditches have a usual depth of 3-7 feet and a maximum depth of 12 feet when equipped with a slanted baffle. These oxidation ditches appear to be limited because the rotors must be spaced short distances apart in series around the channel so that they also operate as booster pumps. The rotors are manufactured by Lakeside Equipment Corporation, Passavant Corporation, Walker Process Division of CBI, and others.

Aeration discs that are about 4.5 feet in diameter and 0.5-1.0 inch thick, made of perforated plastic and mounted on horizontally disposed shafts, rotate at about 60 rpm in oxidation ditches having multiple channels and are spaced short distances apart. These discs are manufactured by Envirex, Inc.

A floating perforated blade type aerator, called the "OTA Aerator", is marketed by Cherne Industrial, Inc. It is 30 inches in diameter and 7 feet long. It has a variable speed hydraulic motor and can also be selectively submerged in order to balance oxygen transfer rate with oxygen demand and ditch velocity.

Jet aerators, such as directional-mix jet aerators manufactured by Pentech Division of Clevepak Industries, Inc., Cedar Falls, Iowa, can be used in deep oxidation ditches, having a depth such as 20 feet, and can thereby have high rates of oxygen transfer compared to surface aeration methods while using diffused or subsurface aeration. However, flow above the jet aerators is induced flow, not pumped flow, so that it is unaerated and later blends with the highly aerated liquor which is ejected from the jets. Backmixing of aerated liquor readily occurs as eddies develop above the jets. Since multiple jet headers must act as booster pumps around the entire channel of a typical oxidation ditch in order to maintain adequate circulation velocity, the entire channel must be constructed with considerable depth (20 feet or greater) in order to provide relatively high oxygen transfer efficiencies.

Inflexibility of operation is characteristic of all prior art oxidation ditches because pumping and oxygen transfer are provided by the same device. Their pump/aerators are also unable to provide for variable depth operation or flow equalization in the oxidation ditch, i.e., a depth variation greater than one foot (except the floating rotor and the jet aerators). In addition, they are unable to compensate for variations in temperature, inflow quantity, inflow BOD(5) content, inflow ammonia content, and mixed liquor suspended solids concentration while maintaining adequate flow velocity and sufficient channel length and volume in the anoxic zone for complete denitrification to occur within the channel so that an effluent having low nitrate concentration is produced and so that rising sludge in the clarifier does not cause solids to overflow from the clarifier.

Of these variables, temperature appears to give the most frequent difficulty. During summertime operations, the microorganisms are very active and rapidly consume the available quantity of dissolved oxygen, but the $C_s$ level is much lower in summer than in winter so that dC is markedly decreased. In consequence, the length of the aerobic zone tends to be quite short if the F/M ratio remains constant. Generally, a need exists for additional aerating capacity during hot weather.

In wintertime, particularly at subfreezing temperatures, pump/aerators of prior art oxidation ditches usually are unable to decrease aerating activity sufficiently while maintaining adequate mixing and propelling activity. Because the flow velocity must always be enough to prevent sedimentation in the channel, large amounts of dissolved oxygen are introduced into the aerobic zone, while the microorganisms are functioning slowly, so that the aerobic zone may extend throughout the endless channel, thereby making denitrification impossible. These effects may be minimized to some extent by increasing the MLSS levels during cold weather, but clarification also becomes less efficient because water becomes more dense as it cools, reaching maximum density at 4° C. (37° F.). The result is that biological suspended solids are likely to be carried out in the effluent from the clarifier, thereby raising its biochemical oxygen demand, when MLSS levels are high during very cold weather.

All prior art oxidation ditches also lack a means to sparge or diffuse air into the circulating mixed liquor at a shallow depth and at a relatively low pressure and using relatively low air compression power, then to pump the air-liquor mixture to a depth greater than the floor or bottom of the channel in order to increase oxygen transfer efficiency by raising oxygen dissolution pressure and oxygen solubility and by concentrating a high mixing power per unit volume into a deep oxygen contact duct. Further, all prior art oxidation ditches are unable to mix air with the liquor within the channel at a depth greater than the channel depth.

During intermittent in-situ settling of the mixed liquor while using the entire oxidation channels as clarifier, all prior art oxidation ditches except the systems of Hungarian Pat. No. 166,160 and of German Pat. No. 2,300,273 have had no means to destroy the momentum of the mixed liquor, thereby enabling settling to commence quickly, except by reversing the pump/aerator, such as the rotors, as described by M. C. Goronszy in "Intermittent Operation of the Extended Aeration Process for Small Systems", *Journal Water Pollution Control Federation*, Volume 51, No. 2, February 1979, pages 274–287.

The ideal design for efficient oxygenation, nitrification, and denitrification is an oxidation ditch having a channel of sufficient oxic nitrification length and volume plus an anoxic denitrification length and volume that can be pumped with any desired number of pump/aerators which are disposed at a single location to provide point-source aeration, as contrasted to the multi-source aeration of the prior art for large oxidation ditches, while aerating homogeneously, rather than heterogeneously.

SUMMARY OF THE INVENTION

It is an object to mix a stream of dispersed oxygen-containing gas continually with all of the mixed liquor flowing within the channel of an oxidation ditch to form a liquor-gas mixture, to pump all of the liquor-gas mixture continuously downwardly into a deep oxygen contact overpressure channel or duct (deep contact duct) located below the bottom of the channel, in order to increase gas-liquor mixing power per unit volume, gas dissolution pressure, oxygen solubility, and oxygen transfer rate, and to return the pumped liquor-gas mixture continuously to the channel at a location downstream of the pumping.

It is still an additional object to provide point-source homogeneous aeration to all of the mixed liquor being pumped into the overpressure channel or duct and thereafter flowing translationally through the endless channel of an oxidation ditch.

It is moreover an object to provide independent oxidation ditch velocity, volume, and aeration control so that a given size oxidation ditch activated sludge process can be operated over a wide range of hydraulic detention times, food-to-biomass ratio, and sludge ages and so that a minimum necessary mixing velocity can be maintained for mixed liquor solids suspension while the dissolved-oxygen content of the mixed liquor is independently varied over a wide range.

It is furthermore an object to provide a process for controlling the lengths and volumes of the aerobic and anoxic zones within the channel of an oxidation ditch in order to adjust and control the relative populations of heterotrophic aerobic, autotrophic aerobic (nitrifying), and heterotrophic facultative (denitrifying) bacteria in order that the oxidation ditch activated sludge process control parameters can be easily regulated and adjusted to maintain optimum performance during seasonal changes in mixed liquor temperature or during daily or seasonal changes in pollutant loading rates.

In accordance with these objectives and the principles of this invention, apparatuses and methods are herein described that provide a feed means for return sludge; a feed means for raw wastewater; a downpumping draft tube axial-flow pump; a mounting means for the pump; a mounting means for the draft tube; a gas dispersal means for diffusing gas into the liquor to form a gas-liquor mixture; a feed means for delivering compressed oxygen-containing gas to the gas dispersal means; a deep oxygen contact duct which is in flow connection with the draft tube of the pump, passes beneath the barrier means at a greater depth than the floor of the oxidation ditch channel and discharges on the downstream side of the intake pump; and a barrier means for: (a) forcing all mixed liquor through the intake pump on the upstream side of the barrier means, (b) preventing backmixing of aerated liquor to the pump intake, and (c) accumulating all aerated liquor on the downstream side of the barrier means. The deep oxygen contact duct is preferably J- or U-shaped.

The deep contact duct may contain throughout any selected portion of its length a gas diffuser, a gas bubble-splitting and mixing means, or an interfacial surface generator. The deep contact duct may also be extended in the direction of flow for a sufficient distance that substantially all of the aerobic activity of the ditch occurs within the duct and under a selected hydraulic overpressure that is greater than the pressure corresponding to the depth of the channel.

The term "oxidation ditch" is currently used for relatively shallow oval-shaped basins in which mixed liquor is continuously circulated by horizontally mounted surface aerators, such as cage rotors and disc rotors, and other terms, such as continuous looped channel and endless channel, are currently used for basins in which the mixed liquor is continuously circulated by surface aerators through a plurality of side-by-side channel portions which have adjoining walls and square or semi-cylindrical ends providing connections between adjacent channel portions. However, the term "oxidation ditch" is employed herein as a general term encompassing both shallow and deep basins, whether circular, oval, or looped in any endless continous loop or spiral configuration.

In such a closed-circuit oxidation ditch, this invention utilizes at least one flow-control apparatus which provides repetitive aerobic treatment to all of the mixed liquor within the channel of the oxidation ditch. The flow-control apparatus comprises a barrier which is sealably attached to the bottom and sides of the oxidation ditch and divides the mixed liquor into upstream liquor within an intake channel and downstream liquor within a discharge channel. The flow-control apparatus also comprises at least one axial-flow pump which operates within an inlet means, such as an inlet opening formed of concrete, or a draft tube and is disposed to receive the upstream liquor and pump it downwardly and further comprises a sparging device, generally mounted within the inlet means, for diffusing an oxygen-containing gas in the mixed liquor. Each pump/aerator is mounted by being attached to the aerator support bridge and comprises a motor, a speed-reduction means, a pump shaft, an axial-flow pump impeller attached to the lower end of the shaft, at least one gas sparge ring, and a downdraft tube surrounding the impeller and the sparge ring.

The deep oxygen contact duct is preferably connected to the downdraft tube, leads downwardly to any desired depth, curves in a downstream direction, and leads upwardly to a discharge point within the discharge channel. Normally, unless a very deep ditch cross-section is used (15–25 feet), the center line of the deep contact duct is at a greater depth than that of the oxidation ditch.

By producing a positive flow in the bottom portion of the channel, the depth of the channel is not limited as in prior art oxidation ditches which have rotors or mechanical surface aerators which can merely induce flow near the bottom of the channel. Solids suspension is thereby assured, even at ditch depths of up to 25 feet, in contrast to rotor-operated oxidation ditches which are generally limited to depths of 3 to 7 feet.

A deep ditch configuration is advantageous because it minimizes land use and conserves heat in the winter, thereby increasing the temperature of the mixed liquor and improving biological activity. In addition, a deep channel reduces liquor surface area, thereby reducing evaporation, misting in the winter, and environmental contamination. Still further, increased channel depth, combined with positive flow (i.e., no backmixing or backpumping) and discharge of oxygen and aerated liquor near the bottom of the channel, produces superior mixing of carbonaceous material and microorganisms with dissolved oxygen, thereby improving biological activity and preventing substantial growth inhibition of coexisting colonies of different microorganisms. It is also an important characteristic of the barrier oxidation ditch that its intensive and uniform mixing of the total flow with all of the oxygen-containing gas produces uniform conditions from top to bottom and from side to side of the channel, i.e., the D.O. profile is uniform, planar, and substantially vertical.

The process of this invention is suitable for use with any oxygen-containing gas, such as air, air enriched with oxygen, or industrial grade oxygen. Therefore, when "air" is used hereinafter, it is to be understood that it means any oxygen-containing gas.

The flow-control apparatus of used in this invention provides separate control of mixed-liquor circulation velocity and of mixed-liquor aeration. This very important operating characteristic can be enhanced because the pumping capacity of the pump/aerator is essentially unaffected by varying the amount of air that is introduced into the sparge ring under the impeller and can be increased by introduction of compressed air to any of the upturn sections of the contact duct. By selectively shifting the proportions of air introduced to the sparge ring and independently to the upturn section of the contact duct, another means for controlling oxygen transfer rate and circulation velocity is made available. The circulation rate and ditch velocity and the oxygen transfer rate can be independently regulated by varying:
(a) operation of the impellers singly or in parallel,
(b) the speeds of the impellers,
(c) the total amount of air that is sparged, and
(d) the proportion of air between the sparge ring and the contact duct.

It is thereby readily possible to regulate the flow rate over a range of from 0.5 ft/sec to at least 3.0 ft/sec while maintaining the desired dissolved-oxygen (D.O.) transfer rate and D.O. concentrations in the oxidation ditch.

One consequence of this capability is that the lengths of the aerobic and anoxic zones within the oxidation ditch can be varied as desired, particularly in response to seasonal temperature changes and daily and seasonal pollutant loading changes. If the flow rate is maintained constant and the D.O. level is decreased, for example, the aerobic zone is shorter and the anoxic zone is longer. If the flow rate is maintained constant, for example, and the D.O. level is increased, the aerobic zone is longer and the anoxic zone is shorter.

The oxygen stripping efficiency of any aeration system is well known to be a function of the following four major parameters: bubble size, bubble retention time, D.O. differential driving force, and hydrostatic pressure.

As the draft tube aerator has been developed for complete mix basins, it is a vertical pumping device with an aeration means for introducing air under pressure below its propeller but at a relatively shallow depth. The air, escaping from holes in a sparge ring or similar air diffuser as the aeration device, is sheared into bubbles by the downwardly moving liquor, and the bubble size is controlled by the shearing force of the liquor. Any large bubbles are suspended by the opposing forces of buoyancy and downward water momentum until they are sheared to a small enough size so that they can be driven down the tube by the moving liquor.

Increased bubble retention time directly increases oxygen transfer efficiency. A draft tube aerator in a complete mix basin provides a controlled detention time that is several times longer than traditional diffused aeration systems, but the pump/aerator of this invention multiplies that amount by several additional times.

D.O. differential driving force is the difference between the dissolved oxygen concentration at saturation and the dissolved oxygen concentration of the liquor entering the draft tube intake. In a traditional complete mix basin designed for nitrification, D.O. levels are normally maintained at 2–3 ppm so that the driving force available for mass transfer is significantly reduced. In an oxidation ditch, however, the D.O. level is easily maintained at 0.5 mg/l or less within the intake zone of the draft tube aerator, thereby raising the relative oxygen transfer rate from 65–77 percent (equivalent to 2.0 to 3.0 mg $O_2$/l) to nearly 95 percent.

The pronounced increase in oxygen solubility that is caused by increased hydrostatic pressure is well known. The barrier oxidation ditch, by forcing the bubbles down the draft tube and then down through the deep oxygen contact duct, provides greater hydrostatic pressure for oxygen solubility than any other wastewater treatment system, with the exception of the deep shaft system.

The barrier oxidation ditch provides the following eight capabilities that are nowhere available in the prior art:

(1) Pumping capacity remains relatively constant, while oxygen supply and dissolved oxygen (D.O.) content of the aerated liquor can be varied at will. Pumping capacities as high as 5 cfs per horsepower are easily attainable by the high specific speed, high flow, low head propellers that are used in these draft tube pump/aerators.

(2) A completely mixed plug flow system is created. Moreover, mixing is independent of oxygen transfer, and a dissolved oxygen profile that is consistently uniform, as a vertical cross-section of the channel contents, can be obtained while having a variable BOD input. Therefore, solids can be suspended in a uniform manner and at a generally higher level than is feasible in prior art oxidation ditches, regardless of oxygen demand and without wasting blower horsepower.

(3) Because the D.O. level in the intake channel is kept very low, at 0.5 mg/l or less, and because the depth for oxygen transfer is greatly increased as compared to prior art oxidation ditches, the driving force for oxygen transfer is maximized.

(4) The volume of the aerobic zone can be controlled by merely adjusting the air supply, without varying the pumping speed, over wide ranges of carbonaceous demand.

(5) Because the barriered pump is a positive pumping mechanism and not partially inductive, as are prior art pumping devices in oxidation ditches, the depth and width of the endless channel can be designed to produce the exact channel velocities that are desired.

(6) Because the pump/aerator is not liquid depth sensitive as are prior art pumping devices that are rigidly mounted, the endless channel can be designed to provide hydraulic equalization.

(7) All of the biological reactions which can be achieved by using controlled retention times in separate basins can be accomplished in the single endless channel of the barrier oxidation ditch. In particular, carbonaceous removal, nitrification, and denitrification reactions can easily be achieved over wide fluctuations in input BOD, particularly if the raw waste is added at the proper location for denitrification.

(8) Several co-existing and viable types of microorganisms can be grown in the endless channel of the barrier oxidation ditch, each passing through favorable zones with sufficient residence time for growth but passing rapidly enough through unfavorable and even hostile zones that substantial inhibition is prevented and the microorganisms become very defensive against biological shock loads.

The storage volume in the endless channel can also be sufficient to minimize other types of shock loads, such as loss of power. In addition, the thorough mixing that occurs in the deep oxygen contact duct and the positive pumping of the large volume of liquor enables the ratio of pumped liquor to incoming wastewater to be high enough (100–600 to one) that shock loads are further minimized, so that undetected organic shocks that produce drops in D.O. content will not produce deflocculation or population death.

The downdraft pump/aerator offers the following additional process control advantages for use in the oxidation ditch process for treatment of wastewater: easier control of power consumption to match oxygen demand; no aerosol spray and minimizing of misting; no freezing problems during cold weather operation as typically occurs with rotor aerators, brush aerators, disk aerators, vertical turbine aerators, and other prior art surface aerators; minimal noise; minimal effect of liquid level variations upon power consumption; and easy compensation for variation of liquid level in the oxidation ditch without the need for floating aerators.

As the draft tube aerator has been developed for complete mix basins, the draft tube (surrounding the impeller and sparge ring) was never extended to the bottom of the basin at the site of use, a U-shaped or J-shaped discharge duct was never connected to the bottom of the draft tube so that it extended to a considerable depth below this bottom, and the discharge end of this duct was never disposed in a selected direction so that it ejected a stream of liquor that would fill and flow through a relatively narrow channel. The downdraft pump/aerator of this invention provides these novel arrangements and advantages and additionally enables compressed air to be introduced at a shallow depth (above the bottom) for mixing with the liquor to form a liquor/air mixture and then to pump this mixture to a considerably greater depth (below the bottom) under conditions of high mixing turbulence (high power per cubic foot) for rapid transfer of oxygen from bubbles to the liquor and then dissolving of oxygen in the liquor.

As described in U.S. Pat. No. 4,455,232 which is fully incorporated herein by reference, the downdraft pump/aerator of this invention is also suitable for use with a submersible liquor pump, such as a Flygt 4500 Submersible Mixer of suitable horsepower which typically rotates at 250–430 rpm. This speed may be contrasted to the low-speed submerged turbine which is described, for example, in U.S. Pat. No. 4,260,486 and which typically rotates at 85–200 rpm. The Flygt Mixer is sold by Flygt Corporation of Norwalk, Conn.

BRIEF DESCRIPTION OF THE DRAWINGS

The accompanying drawings enable the invention to be better understood.

FIG. 4 is a sectional elevation, taken approximately in mid-channel and looking in the direction of the arrows 4—4 in FIG. 3 at the inside pump/aerator.

FIG. 7 is a plan view of a barrier oxidation ditch system, comprising a barrier oxidation ditch having a planar partition means which is centrally and longitudinally disposed to define an endless channel within the racetrack-shaped outer walls of the ditch, a trapezoid-shaped barrier athwart the channel, and two pump/aerators passing beneath the barrier. In combination with the barrier oxidation ditch, the system further comprises a flow-control unit for liquor to be clarified, a circular clarifier which receives mixed liquor from the flow-control unit, a sludge return pump station, and an air supply blower building. Small circles indicate 10 stations at which measurements of hydraulic head were made under four operating conditions in a barrier oxidation ditch having two pump/aerators, each operable at two speeds.

FIG. 15 is a plan view of a typical oxidation ditch equipped with four horizontally disposed rotors as pump/aerators, alternate rotors being idle and on standby.

FIG. 16 is a transverse elevational view through the entire ditch as seen in FIG. 15, looking in the direction of the arrows 16—16 in FIG. 15.

FIG. 17 is a longitudinal elevational view through the entire endless channel of FIG. 16 that depicts the flow path along the center line of the channel in linear fashion.

FIG. 18 is a composite graph, corresponding to FIG. 17, of the same three parameters shown in FIG. 14 for operation of the rotor oxidation ditch.

DETAILED DESCRIPTION OF THE PREFERRED EMBODIMENT

Figure 3:
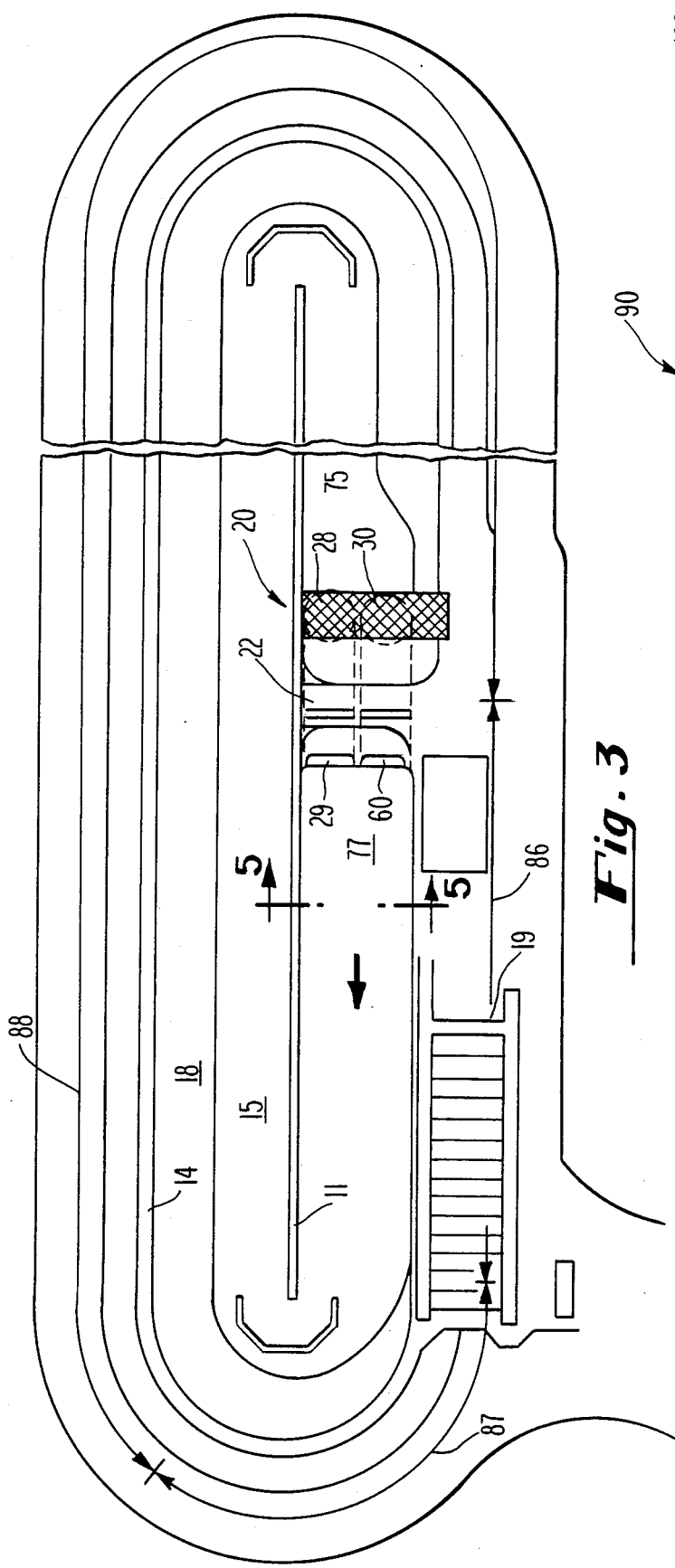
FIG. 3 is a plan view of an oval-shaped oxidation ditch having an island and a double pump/aerator flow-control apparatus disposed athwart one straight channel.
Figure 5:
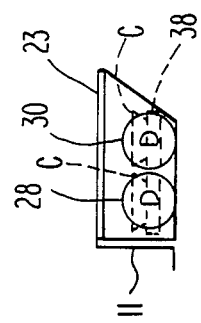
FIG. 5 is a cross-sectional elevation of the oxidation ditch shown in FIG. 3, looking downstream in the direction of the arrows 5—5 in FIG. 3, toward the pump/aerators and the barrier.

The flow-control apparatus 20 of this invention, as shown in FIGS. 3-5, is installed athwart a channel of an oxidation ditch 10 having a central partition 11 and an outer edge 14. Such a channel typically has a floor or bottom 15 and sloping outer side 18. A clarifier 19 is alongside the channel.

The flow-control apparatus 20 comprises a barrier 22, a pair of axial-flow pumps 28 and 30 which are preferably low-speed, vertically mounted, and electrically driven, and respective deep oxygen contact ducts 29 and 60. The barrier 22 comprises a top 23, an upstream side 24, a downstream side 25, and a pair of handrails 26. Barrier 22 is suitably an earthen berm, which is covered on its exposed surfaces with a layer of gunite or a concrete wall.

Pump 30, as clearly seen in FIG. 4, comprises a motor 31, a speed reducer 32 which is connected thereto, a vertically disposed shaft 33, propeller 35 at the bottom end of shaft 33, a coaxially disposed slap ring and a stabilizer cylinder 37 into which the slap ring loosely fits. An intake funnel 38 is disposed around or above propeller 35, and a downdraft tube 39 surrounds propeller 35 and stabilizer cylinder 37.

Pumps 28 and 30 are mounted on walkway 43. An air sparge or diffuser ring 53 is mounted beneath propeller 35 and is connected to an air delivery line 52 which is controlled by valve 55. Stabilizer cylinder 37 is disposed within and supported by ring 53. Air delivery line 51 is connected to pump 30, as shown in FIG. 4, and is controlled by valve 54.

Barrier 22 is also sealably attached to partition 11, sloping side 18, vertical outer side 14, and floor 15 of the channel in which it is disposed and which it divides into intake channel portion 75 and discharge channel portion 77. As seen in FIG. 4, the mixed liquor in this channel may vary over range 44 in height, from high liquor level 48 to low liquor level 49, so there is always at least a minimum submergence depth 46 for propeller 35, a depth that is necessary to prevent vortexing.

Deep oxygen contact duct 60 for pump 30 is connected to downdraft tube 39, curves downwardly and forwardly beneath barrier 22 and curves upwardly again to empty into channel 77, as seen in FIGS. 3 and 4. Deep contact duct 60 comprises declining portion 61, straight section 63 which is connected to portion 61 and is horizontally disposed, and a rising portion which comprises a cylindrical section 65 having converging ends, a straight section 67 having perpendicular ends, and a terminal section 69 having ends sloped in reverse to section 65, so that discharge of aerated mixed liquor and air is at a relatively slight angle to floor 15 of discharge channel portion 77 which is consequently in a constantly turbulent state.

Deep oxygen contact duct 60 is usually exactly like deep oxygen contact duct 29, and description of duct 60 and its accessory devices are to be understood as equally pertinent to duct 29. Additional compressed air may be delivered to contact ducts 29 and 60 as illustrated for duct 60 in FIGS. 3 and 4, by means of a removable diffuser assembly which is vertically installed within a vertically disposed casing pipe which is attached to section 67 but which may be attached to section 63 or to the adjacent sections thereto. The removable diffuser assembly comprises an auxiliary air delivery line 71, controlled by valve 72, which delivers air to diffuser device 76 within straight section 67. Diffuser device 76 is preferably transversely disposed to the flow of liquor within section 67. By selectively adjusting valve 54 and valve 72, the flow rates through discharge duct 60 may be changed to a slight extent, and the aeration of the mixed liquor in duct 60 may be selectively controlled to a large extent, thereby changing the length of aerobic zone 88. This procedure is useful in response to changes in temperature, pH, BOD, and nitrogen load.

Figure 6:
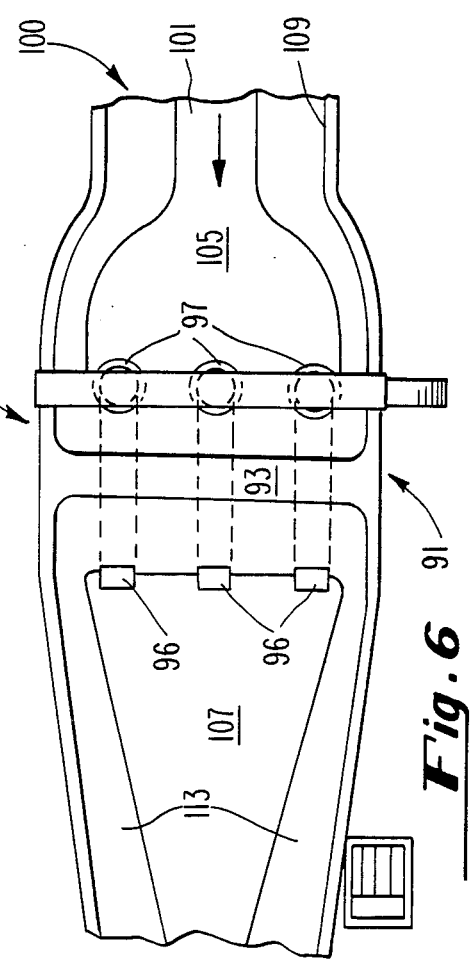
FIG. 6 is a plan view of a portion of an oxidation ditch, similar to the ditch of FIG. 3, having a triple pump/aerator flow-control apparatus which is disposed athwart a straight channel.

The flow-control apparatus of this invention may be of any desired size and may have any number of turbines in side-by-side relationship, as illustrated in FIG. 6 for a triple-pump/aerator installation. In a straight channel, having sides 109 and floor 101, of oxidation ditch 100, sides 109 become farther apart and steeper to define the much broader floor of an intake channel 105 which is separated from a discharge channel 107 by flow-control apparatus 90, comprising barrier 91, pump/aerators 97, and deep oxygen contact ducts 96. Barrier 91 comprises top 93 and downstream bottom edge 94. Discharge channel 107 has sides 113 which gradually converge and become less steeply sloped to define a channel floor 101 of normal channel width.

The axial-flow pump/aerator which is preferred for use in the flow-control apparatus of this invention is equipped with a down-flow, high-efficiency propeller and a sparge ring, as the aerating device, which is mounted immediately below the propeller, both being surrounded by a vertically disposed and relatively short draft tube. Alternatively, the pump may be mounted within an inlet opening formed within the channel bottom. Such a pump is preferably disposed within the intake channel with its intake at a selected distance below the surface at low water level. However, the pump may satisfactorily be located within the barrier itself, in an island inside of the endless channel, or in the outer side area, provided that the intake of the pump is always in flow communication with the intake channel portion and exposed to sufficient intake head and provided that the terminus of the deep oxygen contact duct is in flow communication with the discharge channel portion. The barrier may also be formed by a portion of the side wall of the channel or of a plurality of channels if the channel is arranged in spiral fashion so that the deep oxygen contact duct passes more or less transversely beneath one or more channels.

A down-flow pump, at the inlet end of the contact duct, may be combined with either an up-flow axial-flow pump or a surface aerator at the outlet end thereof, and a removable air diffuser means can additionally be mounted within the contact duct, so that there can be as many as three or even four points of aeration. The advantage of such combinations is that the oxygen transfer rate and the speed of reaction of the microorganisms under pressure is utilized, whereby the aerobic portion of the ditch may be shortened.

The aeration means for introducing air to the mixed liquor being pumped from the intake channel to the discharge channel comprises a source of compressed air, a sparge and/or diffuser means for producing air bubbles, and a delivery means for moving the compressed air from the source thereof, such as a blower or air compressor in blower building 141 of FIG. 7, to the sparge means.

When supplementary air or industrial oxygen is desired, as when BOD loads are very heavy, or when it is desirable to substitute discharge duct aeration for turbine aeration because of flow rate considerations, diffuser 76 in updraft section 67 is utilized by adjusting valve 72 which selectively admits compressed air (not shown in the drawings) into auxiliary air delivery line 71 and thence into diffuser 76. The compressed air, liberated as bubbles, is swept along through discharge duct 60 to form a mixture of relatively low density so that the velocity of upwardly translational movement through sections 67, 65, and 69 is markedly increased by an air-lift pumping effect acting in addition to the pumping effect of the submerged turbine propeller.

Figure 1:
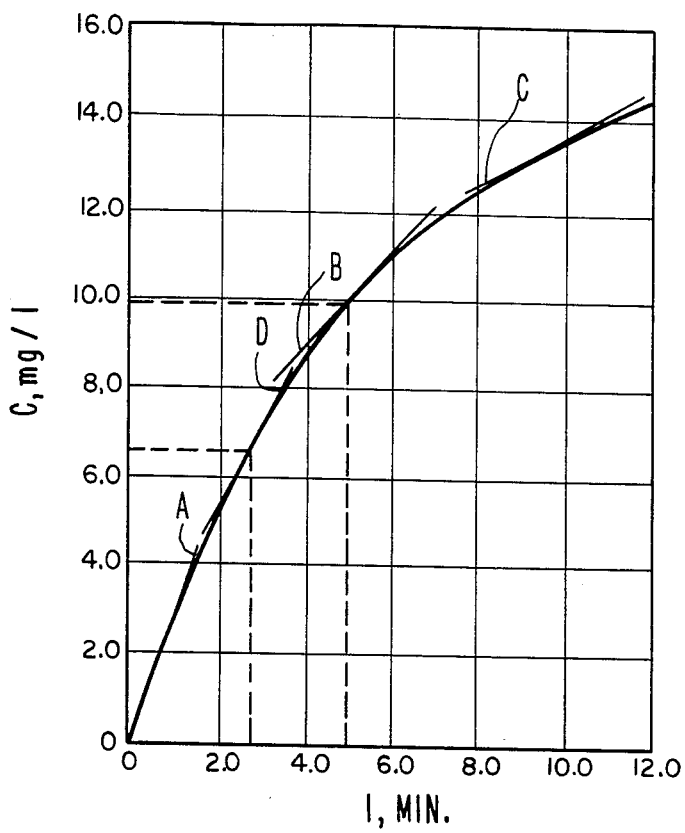
FIG. 1 is a graph showing cumulative concentration of dissolved oxygen in initially deaerated water as a function of cumulative aerating time for a low-speed mechanical surface aerator in a tank, as conventionally obtained while testing prior art aerators.
Figure 2:
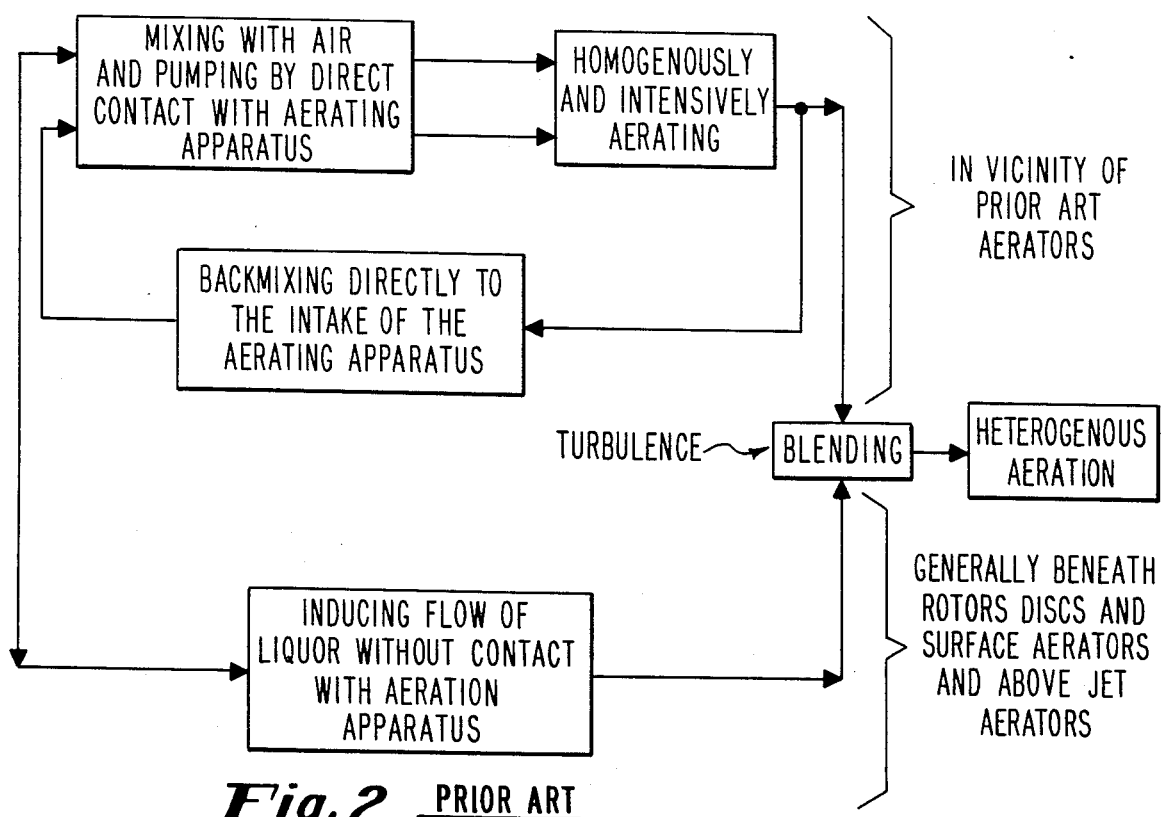
FIG. 2 is a schematic flow chart showing the movements of aerated and unaerated liquors, in the vicinities of prior art aerators of oxidation ditches, that result in backmixing and heterogeneous aeration.

Air diffuser 76 and its respective air delivery line 71 are removably mounted within diffuser access duct 66 which is sealably attached to discharge duct 60, as shown in FIG. 2, as by welding. Air delivery line 71 is preferably a straight pipe, and diffuser device 76 may be transversely disposed within discharge duct 60. Mixed liquor rises approximately to the same level as in channels 75, 77 of oxidation ditch 10, within the annular spaces between diffuser access ducts 66 and air delivery line 71 and in the corresponding access duct attached to duct 29. If one of the diffuser devices ever becomes clogged or requires maintenance, a union at the top of its delivery line can be opened so that the assembly can be lifted out of its casing for cleaning the sparge tube.

In FIG. 3, aerobic zone 86 extends from the pumps 28, 30 to a relatively short distance, such as 100–200 feet, downstream therefrom. This relatively short-length aerobic zone represents an overall high D.O. process condition.

Channel zone 87, around the bend, represents an additional length of aerobic activity in the channel of oxidation ditch 10. The remainder of the channel, zone 88, is at an anoxic level of about 0.5 mg/l or less of dissolved oxygen. This combined distance, divided by the remainder of the distance along the channel, produces an aerobic/anoxic ratio that is heavily biased toward denitrifying.

Moreover, when the incoming wastewater feed is added via line 57, just above floor 15 of the channel in the return bend, organic carbon food sources are maximized for any heterotrophic facultative denitrifying bacteria that are present in the circulating mixed liquor. In addition, any nitrate oxygen that is available in the circulating mixed liquor for carbonaceous BOD reduction is utilized as fully as possible. Furthermore, any nitrate oxygen that is available in the circulating mixed liquor is utilizable for oxidation of any hydrogen sulfide that is present in the feed waste, such as an anaerobic lagoon effluent. Such utilization is performed by certain denitrifying bacteria that become active in the anoxic environment of the return bend. These bacteria utilize nitrate oxygen as their oxygen source and hydrogen sulfide as their food or energy source.

By such utilization, hydrogen sulfide in the wastewater feed from the anaerobic lagoon is used to maximize denitrification and to minimize consumption of free dissolved oxygen for chemical and biological oxidation of hydrogen sulfide, thereby enabling free dissolved oxygen to be used to a maximum extent for biological BOD removal and nitrification.

Locating the inlet pipe or an inlet flow diffuser or distribution pipe just above or along floor 15 of the return bend, where turbulence naturally occurs, enhances opportunities for hydrogen sulfide to mix with the mixed liquor and minimizes its likelihood of escaping to the atmosphere.

By inspection of FIG. 4, high water level 48 differs from low water level 49 by height 44, and low water level 48 is above impeller 35 by submergence depth 46 which is the minimum depth under which aerators 28, 30 can operate without vortexing.

Barrier 22 typically performs the following functions:
  A. complete prevention of backpumping of some
     liquor from the discharge ends of contact ducts 29, 60 to the intakes of pumps 28, 30, thereby preventing backmixing of aerated mixed liquor for re-aeration within ducts 29, 60;

B. maximizing the oxygen transfer driving force across the intakes and discharges of draft tube aerators 28, 30 and contact ducts 29, 60 by:
   (1) allowing very low intake D.O. concentration, and
   (2) maximizing HP/unit volume and increasing turbulence, thereby decreasing the energy required for dissolving a given quantity of oxygen in the mixed liquor and increasing the oxygen transfer efficiency; and C. complete prevention of induced flow past pumps 28, 60, as a continuation of translational movement within the endless channel, thereby preventing the occurrence of heterogeneous aeration or blending within discharge channel 77 and avoiding propulsion limitations.

Barrier oxidation ditches 10 and 120, as seen in FIGS. 3 and 7 in plan view, are sometimes termed total barrier oxidation ditches (TBOD), indicating that there are no gateways or openings in the barrier, as taught in U.S. Pat. No. 4,278,547, and therefore no possibility of any induced flow passing the barrier.

Ditch 120 comprises an endless channel formed by a centrally disposed partition 122 within an outside wall 123, a floor or bottom 121, a sloping outer bottom which meets flat bottom 121 along line 129, a barrier 130, pump/aerators 126 and 127, and a pair of turning baffles 128. Barrier 130 has a top 131, a sloping upstream side 134, and a sloping downstream side 135. Pump/aerators 126, 127 are positioned beneath a walkway and are connected to deep oxygen contact ducts 132, 133 which pass beneath barrier 130 and connect intake channel 137 to discharge channel 138.

An air supply blower building 141 is disposed alongside wall 123 of ditch 120 and close to walkway 136. Compressed air is sent to pump/aerators 126, 127 through line 142. A flow control unit 143 is also located near outside wall 123 but downstream of discharge channel 138. A clarifier 145 is additionally located nearby. It receives mixed liquor from unit 143 through line 144 and sends clarified liquor to disposal through line 147. Settled sludge is received by sludge return pump station 149 and returned to the endless channel through line 148.

The invention may be more thoroughly understood by study of the following examples, with reference to the drawings.

EXAMPLE I

An oxidation ditch as shown in FIGS. 3–5 was designed using aerating, not mixing, as the design criterion, and constructed to treat wastewater effluent from an anaerobic lagoon used for pretreatment and flow equalization of raw wastewater produced by a poultry processing plant. This anaerobic effluent was anticipated to have the following characteristics:

Biochemical oxygen demand, BOD (5) = 240 mg/l
Total Kjeldahl nitrogen, TKN = 30 mg/l
pH = 7.0

The average daily flow of anaerobic lagoon effluent was anticipated to be 1,000,000 gallons per day (1 MGD), 7 days per week, 24 hours per day.

The maximum average BOD(5) loading, with nitrification, into the oxidation ditch was calculated as follows (mg/l = #/million #): (1.0 MGD) (8.34 #/gal.) (240 mg/l) = 2000 #BOD(5)/day.

The maximum average TKN loading into the oxidation ditch was calculated as follows:

(1.0 MGD) (8.34) (30 mg/l) = 250 #/day

The maximum oxygen demand at process or field conditions for an extended aeration process operated for maximum degree of nitrification was calculated, assuming a design conversion factor of 1.8# oxygen/#BOD(5) and 4.57# oxygen/#TKN applied:

Actual Oxygen Rate $(AOR_A) =$ $$\frac{2,000 \ \#BOD(5)/Day \times 1.8 \ \#O_2/\#BOD(5)}{24 \ hrs/day} +$$

$$\frac{(250\# \ NH_3/day \times 4.57 \ \#O_2/\#NH_3) \times (1-N)(1-ORF)}{24 \ hrs/day}$$

$$AOR_A = \frac{(2,000 \times 1.8) + 4.57 (1 - 0.16)(1 - 0.45)}{24} =$$

172 $\#O_2$/hr. (Summer Season Minimum)

where
N = ammonia nitrogen biomass uptake factor = 4.8/30 = 0.16
ORF = nitrate oxygen reuse factor due to denitrification, with the theoretical maximum nitrate oxygen reuse being 0.625 and 0.50 being assumed to be pertinent to the site and conditions at 90% efficiency, so that ORF = (0.50)(0.90) = 0.45.

The oxygen required at standard conditions (20° C., one atmosphere, zero dissolved oxygen), assuming the calculated conversion factor from process to standard conditions = 1.42, was calculated, using 20° C. as the standard mixed liquor temperature so that $1.024^{T-20} = 1.0$, $C_s = 9.2$ mg/l, and DTA intake, D.O.$_{.i} = 0$ mg/l. The solubility of oxygen in tap water at 20° C. and site altitude of 1,000 feet was also calculated, using the mid-depth method for the depth of 30 feet, as follows:

$$C_{sw} = 9.2 \left[ \frac{0.97 \times 14.7 + (0.5)(0.433)(30)}{14.7} \right] = 12.99 \ mg/l$$

$$C_{ss} = 9.2 \left[ \frac{14.7 + (0.5)(0.433)(30)}{14.7} \right] = 13.26 \ mg/l$$

Standard Oxygen Rate $(SOR) = \dfrac{13.26}{[(0.90)(12.99) - 1.333](0.9)(1.0)}$

SOR = 1.4224
$SOR_{20° C.}$ = AOR  (1.4224) = (172)(1.4224) = 245 $\#O_2$/hr.

Assuming that two draft tube aerators (DTA's) would be needed to satisfy this total oxygen requirement, each aerator would have to provide 122.5 pounds of oxygen/hour.

The manufacturer of the draft tube aerators had recommended selection of two dual-speed 40/17 hp DTA's, each with a dual-speed 15/10 hp blower to supply approximately 418/209 cfm to an air sparge assembly disposed directly below each DTA impeller.

The volume of the oxidation ditch was calculated so that at high water level, with 6,000 mg/l of mixed liquor suspended solids (MLSS) in its channel (the mixed liquor having a specific gravity of 1.0), it would be possible to maintain a food-to-microorganism ratio (F/M) of 0.040 (out of a feasible range of 0.01 to 2.0), as follows:

$$\frac{2,000\# \, BOD(5)/day}{(8.34)(6,000\# \, MLSS/\text{million } \#\text{mixed liquor})[0.04\# \, BOD(5)/\#MLSS]} = 1.0 \text{ million gallons.}$$

Using the calculated ditch volume of 1,000,000 gallons, equalling 133,672 cubic feet, the volumetric loading was calculated as follows:

$$\frac{2,000\# \, BOD(5)/day}{133.7 \times 10^3 \, ft^3} = 15.0\# \, BOD(5)/1,000 \, ft^3$$

The channel cross-sectional dimensions were next determined, using the DTA manufacturer's estimate that each 40-hp turbine would pump approximately 97 ft³/sec. at low speed and 129 cfs at high speed when operating in the channel of the barrier oxidation ditch. With two such turbines in operation, the total pumping rates would be 194 cubic feet per second at low speed and 258 cfs at high speed.

The design minimum channel velocity is 0.75 feet per second (fps). The design pumping rate in the channel per DTA is 129 cubic feet per second (cfs) at high speed. The maximum channel area required is 129 cfs/0.75 fps = 172 ft², so that the channel length required is 133,672 ft³/172 ft² = 777 ft. For a depth at high water level (HWL) of ten feet, the following relationships apply: one DTA at high speed produces 0.75 fps, two DTA's at low speed produce 1.13 fps, and two DTA's at high speed produce 150 fps. The minimum circuit transit time through the channel is 8.6 minutes, and the maximum is 17.3 minutes.

The channel was then designed with a trapezoidal cross-section as seen in FIG. 5 (although rectangular, square, round, oval, or other shapes could be substituted) to furnish this flow rate.

Using 209 cfm at low speed and 418 cfm at high speed, the motors for the draft tube aerators were chosen as 40 horsepower at high speed and 17 horsepower at low-speed, respective motor rpm being 1200/900. The draft tube diameter was selected to be 60 inches, and the maximum sparge submergence was selected to be 84 inches. At high speed, each DTA will draw 39 bhp, sparge 418 cfm, and pump 129 cfs. At low speed, each DTA will draw 16.5 bhp, sparge 209 cfm, and pump 97 cfs.

One blower was selected per draft tube aerator with a two-speed motor using 15/11 horsepower at 1800/1200 rpm, supplying air at an estimated 4.5 psig, depending upon air supply piping losses. High-speed performance was calculated to be 12.1 bhp at low water level, supplying 418 cfm. Low-speed performance was calculated to be 7.4 bhp at low water level, supplying 209 cfm.

Overall oxygen transfer efficiencies were calculated to be at low water level (LWL) as follows.

Adding 39 bhp for each DTA and 12.1 bhp for each blower at high speed gives a total of 51.1 bhp. Dividing this energy consumption into 260# O₂/hr, as the SOR adjusted to mean sea level and 20° C., gives 5.09# O₂/bhp/hr at high speed.

Adding 16.5 bhp for each DTA and 7.4 bhp for each blower at low speed gives a total of 23.9 bhp. Dividing this energy consumption into 130# O₂/hr, as the SOR adjusted to mean sea level and 20° C., gives 5.44# O₂/bhp/hr at low speed.

EXAMPLE II

Calculation of Oxygen Transfer Efficiencies for Rotor and Carrousel Oxidation Ditches with Different Amounts of Blending and Machmixing AOR = 172#O₂/hr (total); 86#O₂/hr/rotor = Actual Oxygenation Rate
ALT = 1000'; T = 20° C.

$$\alpha = 0.90 = \frac{\text{oxygen transfer rate in wastewater}}{\text{oxygen transfer rate in tap water}}$$

$$\beta = 0.90 = \frac{\text{oxygen saturation rate in wastewater}}{\text{oxygen saturation rate in tap water}}$$

P = 0.97, as altitude correction factor
Z = O for Surface Aerator = oxygen transfer depth $$C_{sw} = 9.2 \left[ \frac{0.97 \times 14.7 + (1.5)(0.433)(0)}{14.7} \right] = 8.924 \text{ mg/l}$$

Css = 9.2 mg/l
DO$_{in}$ = assume D.O. of unaerated mixed liquor = 0 mg/l
DO$_{out}$ = downstream blended D.O.
IF = unaerated induced flow
BF = backmixed flow
AF = aerated flow
BF = blended flow = total ditch flow = Q
E = efficiency, #O₂/bhp/hr Assumed Rotor Ditch Design Under normal operating conditions, two rotor surface aerators are in service, and two are not in operation but are used for standby service.

Assume aerator standard rate oxygen transfer efficiency = 3.0#O₂/bhp/hr.

Assumed Carrousel Ditch Design

Under normal operating conditions, one surface aerator is in service, and one is not in operation but is used for standby service.

Assume aerator standard rate oxygen transfer efficiency = 3.5# O₂/bhp/hr.

An A-series of five hypothetical trials was calculated for both the rotor and the Carrousel oxidation ditches in order to investigate the energy costs of blending aerated liquor with unaerated liquor, assuming no backmixing. A B-series of four hypothetical trials was also calculated for both the rotor and the Carrousel ditches to investigate the energy costs of backmixing aerated liquor to the aerator intake while ignoring blending costs. An illustration of each trial series follows hereinafter, and the results for all trials are summarized in Table II. The efficiencies are plotted in FIGS. 8 and 9 in terms of pounds of oxygen transferred from air bubbles to mixed liquor per brake horsepower per hour as a function of actually pumped and aerated flow (AF) in FIG. 8 and as a function of backmixed flow (BF) in FIG. 9 for the rotor type of oxidation ditch, the Carrousel type of oxidation ditch, and the barrier oxidation ditch. A dotted line indicates improbable or unrealistic operating conditions. Exemplary calculations are given hereinafter for Trials #3A, 1B, and 2B.

TRIAL #3A (Probable Carrousel Operation - Not Probable Rotor Operation)

$DO_1 = 0$ mg/l
$BF = 0$
$IF = \frac{1}{2}$
$AF = \frac{1}{2}$

With Rotor Ditch:

$$\frac{1}{2}Q(O) + \frac{1}{2}Q(X) = Q(1.0)$$
$$X = 2.0 \text{ mg/l}$$
$$\text{Average DO} = \frac{2}{3}(2) = 1.33 \text{ mg/l}$$

$$SOR = AOR = \left[\frac{9.2}{[(.90)(8.924) - 1.33](.90)(1.0)}\right]$$

$$= AOR(1.525) = 86(1.525) = 131.2 \text{\# } O_2/\text{hr/unit}$$

$$\frac{131.2 \text{\# } O_2/\text{hr}}{3.0 \text{\# } O_2/\text{bhp/hr}} = 43.7 \text{ bhp}$$

Use two-50 HP Rotors for Operation and two-50 HP Rotors for Standby $$E = \frac{172 \text{\# } O_2/\text{hr}}{43.7(2)\text{bhp}} = 1.968 \text{\# } O_2/\text{bhp/hr}$$

With Carrousel Ditch $$\frac{1}{2}Q(O) + \frac{1}{2}Q(X) = Q(2.0 \text{ mg/l})$$
$$X = 4.0 \text{ mg/l}$$
$$\text{Average DO} = \frac{2}{3}(4) = 2.67 \text{ mg/l}$$

$$SOR = AOR = \left[\frac{9.2}{[(.90)(8.924) - 2.67](.90)(1.0)}\right]$$

$SOR = AOR(1.91) = 172(1.91) = 328.5\text{\# } O_2/\text{hr/unit}$
Assume Carrousel Aerator SOR Transfer Rate = 3.5# $O_2$/bhp/hr $$\frac{328.5 \text{\# } O_2/\text{hr}}{3.5 \text{\# } O_2/\text{bhp/hr}} = 93.8 \text{ bhp}$$

Use one-100 HP Surface Aerator for Normal Operation and one-100 HP Standby Aerator $$E = \frac{172 \text{\# } O_2/\text{hr}}{93.8 \text{ bhp}} = 1.83 \text{\# } O_2/\text{bhp/hr}$$

TRIAL #1B

With Rotor Ditch:

$DO_{in} = 0$ mg/l; $DO_{out} = 1$ mg/l
$BF = 0.10 Q$
$IF = 0.767 Q$
$AF = 0.233 Q$ of which 0.100 is BF Assuming rotors have same total direct pumping capacity as in TRIAL #1A:
$0.233 Q(X) + 0.767 Q(O) = Q(1.0)$
$0.233(X) = 1.0$
$X = 4.29$
Average DO $= \frac{2}{3}(4.29) = 2.86$ mg/l $$SOR = AOR = \left[\frac{9.2}{[(.90)(8.924) - 2.86](.90)(1.0)}\right]$$

$= AOR(1.977)$
$= 86(1.977) = 170\text{\# } O_2/\text{hr/unit}$

-continued $$\frac{170 \text{\# } O_2/\text{hr}}{3.0 \text{\# } O_2/\text{bhp/hr}} = 57 \text{ bhp}$$

Use two-60 HP Rotors for Operation and two-60 HP Rotors for Standby.

$$E = \frac{172 \text{\# } O_2/\text{hr}}{57(2)\text{bhp}} = 1.51 \text{\# } O_2/\text{bhp/hr}$$

With Carrousel Ditch:

$DO_{in} = 0$ mg/l; $DO_{out} = 1$ mg/l
$0.233 Q(X) + 0.767 Q(O) = Q(2.0)$
$X = 8.58$ mg/l
Average DO $= \frac{2}{3}(8.58) = 5.72$ mg/l $$SOR = AOR = \left[\frac{9.2}{[(.90)(8.924) - 5.72](.90)(1.0)}\right]$$

$SOR = AOR(4.42) = 172(4.42) = 761\text{\# } O_2/\text{hr/unit}$ $$\frac{761 \text{\# } O_2/\text{hr}}{3.5 \text{\# } O_2/\text{bhp/hr}} = 217.3 \text{ bhp}$$

Use one-225 HP Surface Aerator for Normal Operation and one-225 HP Standby Aerator $$E = \frac{172 \text{\# } O_2/\text{hr}}{217.3 \text{ bhp}} = 0.79 \text{\# } O_2/\text{bhp/hr}$$

TRIAL #2B

With Rotor Ditch:

$DO_{in} = 0$ mg/l; $DO_{out} = 1$ mg/l
$BF = 0.20 Q$
$IF = 0.867 Q$
$AF = 0.333 - 0.20 = 0.133 Q$
$0.133 Q(X) + 0.867 Q(O) = Q(1.0)$
$0.133(X) = 1.0$
$X = 7.52$ mg/l
Average DO $= 7.52(.667) = 5.016$ $$SOR = AOR = \left[\frac{9.2}{[(.90)(8.924) - 5.02](.90)(1.0)}\right]$$

$= AOR(3.394)$
$= 86(3.394) = 292\text{\# } O_2/\text{hr/unit}$ $$\frac{292 \text{\# } O_2/\text{hr}}{3.0 \text{\# } O_2/\text{bhp/hr}} = 97 \text{ bhp}$$

Use two-100 HP Rotors for Operation and two-100 HP for Standby.

$$E = \frac{172 \text{\# } O_2/\text{hr}}{(2)(97)\text{bhp}} = 0.887 \text{\# } O_2/\text{bhp/hr}$$

With Carrousel Ditch:

$DO_{in} = 0$ mg/l; $DO_{out} = 2$ mg/l
$0.133 Q(X) + 0.867 (Q)(O) = Q(2.0)$
$X = 15.04$ mg/l
Average DO $= \frac{2}{3}(15.04) = 10$ mg/l $$SOR = AOR = \left[\frac{9.2}{[(.90)(8.924) - 10](.90)(1.0)}\right]$$

$= -5.19$
(The negative result indicates that the SOR is unrealistic.)

TABLE II

COMPARISONS OF OXYGEN TRANSFER EFFICIENCIES OF ROTOR, CARROUSEL AND BARRIER OXIDATION DITCHES

| TRIAL | AOR | AF* | IF* | BF* | $DO_{in}$ (mg/l) | $DO_{out}$ (mg/l) | $DO_{avg}$ (mg/l) | Total SOR $\#O_2$/hr. | E $\#O_2$/bhp/hr. | Comments |
|---|---|---|---|---|---|---|---|---|---|---|
| #1A ROTOR | 172 | 0.333 | 0.667 | 0 | 0 | 1 | 2.0 | 292 | 1.76 | Probable |
| #2A ROTOR | 172 | 0.25 | 0.75 | 0 | 0 | 1 | 2.67 | 328 | 1.57 | Probable |
| #3A ROTOR | 172 | 0.50 | 0.50 | 0 | 0 | 1 | 1.33 | 262 | 1.97 | Not Prob. |
| #3A CARR. | 172 | 0.50 | 0.50 | 0 | 0 | 2 | 2.67 | 329 | 1.83 | Probable |
| #4A ROTOR | 172 | 0.75 | 0.25 | 0 | 0 | 1 | .889 | 246 | 2.10 | Not Prob. |
| #4A CARR. | 172 | 0.75 | 0.25 | 0 | 0 | 2 | 1.78 | 281 | 2.14 | Not Prob. |
| #5A ROTOR | 172 | 1.0 | 0 | 0 | 0 | 1 | 0.667 | 239 | 2.15 | Not Prob. |
| #5A CARR. | 172 | 1.0 | 0 | 0 | 0 | 2 | 1.33 | 262 | 2.30 | Not Prob. |
| #1B ROTOR | 172 | 0.233 | 0.767 | 0.1 | 0 | 1 | 2.86 | 340 | 1.51 | Probable |
| #1B CARR. | 172 | 0.233 | 0.767 | 0.1 | 0 | 2 | 5.72 | 761 | 0.79 | Probable |
| #2B ROTOR | 172 | 0.133 | 0.867 | 0.2 | 0 | 1 | 5.02 | 584 | 0.89 | Not Prob. |
| #2B CARR. | 172 | 0.133 | 0.867 | 0.2 | 0 | 2 | 10.0 | — | — | Not Prob. |
| #3B ROTOR | 172 | 0.183 | 0.817 | 0.15 | 0 | 1 | 3.65 | 401 | 1.28 | Not Prob. |
| #3B CARR. | 172 | 0.183 | 0.817 | 0.15 | 0 | 2 | 7.29 | 237 | 0.25 | Not Prob. |
| #4B ROTOR | 172 | 0.283 | 0.717 | 0.05 | 0 | 1 | 2.37 | 311 | 1.65 | Probable |
| #4B CARR. | 172 | 0.283 | 0.717 | 0.05 | 0 | 2 | 4.71 | 529 | 1.137 | Probable |
| TBOD | 172 | 1.0 | 0 | 0 | 0 | 2 | 1.333 | 245 | 3.60 | Probable |

AOR = Actual Oxygenation Rate, as pounds of oxygen transferred per hour for all Rotors, Surface Aerators, and Downflow Pump Aerators which operate within the channel of any oxidation ditch.
AF = actually pumped and directly aerated flow, as fraction of total flow, Q.
IF = induced flow, as fraction of total flow, Q.
BF = backmixed flow, as fraction of total flow, Q, in channel of any oxidation ditch.
E = oxygen transfer efficiency into mixed liquor at site.
*Total Barrier Oxidation Ditch Circulation Flow Rate = 1.0 Q, with no Induced Flow (IF) and no Backmixed Flow (BF) being possible.

EXAMPLE III

Figure 19:
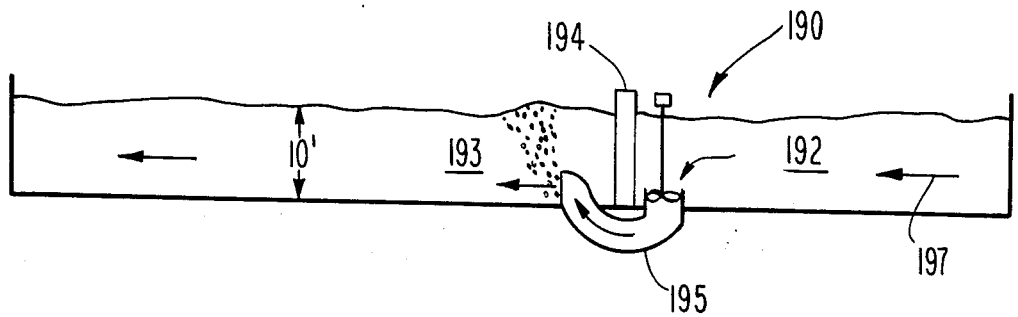
FIG. 19 is a longitudinal sectional elevational view through the middle of the endless channel of a barrier oxidation ditch, as seen in plan view in FIGS. 3 and 7, that depicts the entire flow path in linear fashion and the hydrostatic head along the flow path on a highly exaggerated scale.
Figure 20:
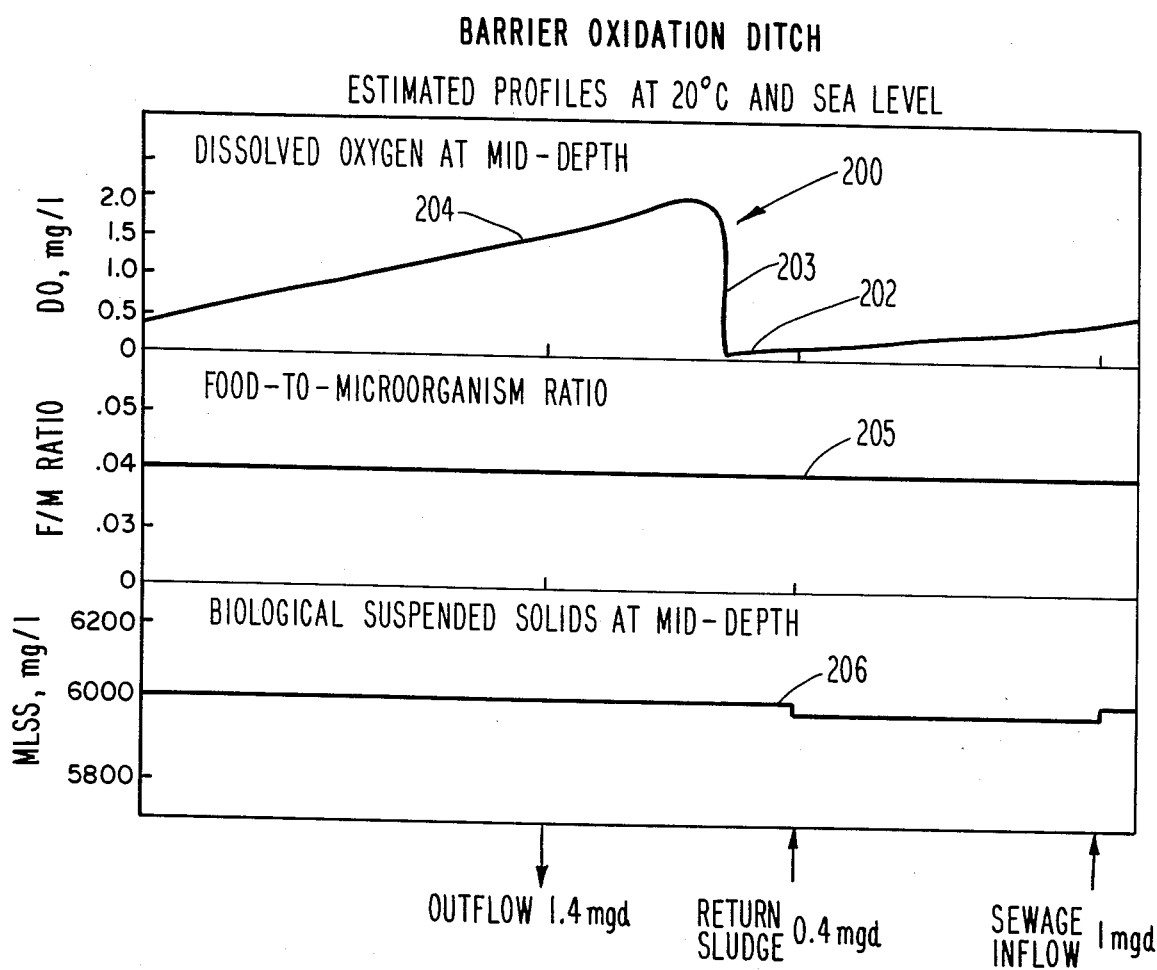
FIG. 20 is a composite graph, corresponding to FIG. 19, of the same three parameters shown in FIGS. 14 and 18, assuming usage of the same horsepower as in FIGS. 15-18.

FIGS. 10-20 present a graphical comparison of performance for three types of wastewater treatment systems under an assumed set of comparison conditions which include one million gallons per day of influent liquor containing 200 mg/l $BOD_u$. The purpose of the exhibit is to show how dissimilar the Imhoff Fish Pond System, illustrated by FIGS. 10-14, is to a Rotor Oxidation Ditch, illustrated by FIGS. 15-18, and to show how the Barrier Oxidation Ditch, illustrated by FIGS. 19 and 20, is a significant improvement on the Rotor Oxidation Ditch (FIGS. 15-18).

The results show a very obvious difference in the Imhoff Fish Pond System and the Oxidation Ditches. The Imhoff system, illustrated in plan view in FIG. 10, in transverse section in FIG. 11, and in longitudinal section in FIGS. 12 and 13, depends on algae to supply the oxygen and, because settling and recycling of the biomass is not practiced, has a very low concentration of MLSS. It was calculated that when the flow reaches the air unit, it is commonly supersaturated with oxygen because of algae activity. Especially in warm sunny weather, the air unit actually strips oxygen from the liquid, down to the saturation concentration, rather than accomplishing any transfer of oxygen from the air to the liquid. The purpose of the air unit in the original design was to accomplish pumping of the liquid rather than oxygen transfer, and it seems certain that this is primarily what it would achieve. A detailed evaluation of the system is given in FIG. 14 for certain parameters.

These parameters are: Dissolved Oxygen (D.O.) in mg/l or ppm at mid-depth in the fish pond and in the circulation ditch, as shown by curve 161; Food-to-Microorganism Ratio (F/M) by weight, as shown by curve 163; and Biological (Mixed Liquor) Suspended Solids (MLSS) in mg/l at Mid-Depth in the pond and in the ditch, as shown by curve 165. Drastic differences occur in each curve 161, 163, 165 where the settled sewage feeds into the ditch. Curve 161 reveals the strong oxygenating capability of algae in the pond, particularly in late afternoon on warm days, and the tendency of the airlift pump to strip excess dissolved oxygen from the incoming pond water. Curve 165 shows the diluting effect of the settled sewage and a rising concentration as the small numbers of microorganisms consume the available food in solution and multiply, while utilizing the dissolved oxygen which is rapidly replenished by algae and wind at the surface of the ditch and pond, and then settle within the pond.

The rotor oxidation ditch is shown as a plan view in FIG. 15, as a transverse sectional elevation view in FIG. 16, and as a longitudinal sectional view in FIG. 17 wherein the idled rotors are omitted. Rotors 171a, 171c are powered; rotors 171b, 171d are idled. Return sludge stream 174 is located close to powered rotor 171a. Inflow stream 175 is located close to idled rotor 171b. Outflow stream 176 is downstream of powered rotor 171c.

For the defined conditions, as given in Table II, the rotor oxidation ditch produces very uniform levels of the F/M ratio and the MLSS content, but the dissolved oxygen content (D.O.) obviously varies markedly with proximity to the powered rotors, as shown in FIG. 18, wherein summertime conditions are illustrated.

Curves 181, 182, 183 show the rapid aeration and utilization of dissolved oxygen in the channel of the rotor oxidation ditch at the surface, at mid-depth, and at bottom, respectively. As seen in FIG. 17, the mixed liquor is moving in direction 177 beneath the two powered rotors 171a, 171c. Rotors 171b, 171d are idled and in reserve. Each powered rotor 171a, 171c is flinging liquor 172, 173, liquor 172 being backmixed.

The rapid changes at the surface of the mixed liquor, as indicated by curve 181, show that the dissolved oxygen content of the liquor is quickly increased each time it passes beneath a powered rotor 171a, 171c and is soon decreased between these rotors by the activity of the microorganisms. At mid-depth, as indicated by curve 182, changes in D.O. content are much less pronounced, but they follow the same pattern as curve 181. At the bottom of the endless channel, however, the D.O. content of the mixed liquor, as indicated by curve 183, tends to rise very little above the residual level.

Curve 185 shows an essentially constant level for the F/M ratio throughout the length of the ditch. Curve 187 shows the relatively slight effects upon Biological (Mixed Liquor) Suspended Solids (MLSS) within the channel as the return sludge and sewage inflow enter the channel.

The barrier oxidation ditch 190, shown as a schematic sectional elevation in FIG. 19, is a total barrier oxidation ditch for which the calculations in Table II are fully applicable. Anoxic mixed liquor, flowing translationally in direction 197, enters intake channel 192 and then descends into pump/aerator/contact duct 195, passing beneath bottom 191 and barrier 194, to enter discharge channel 193 as aerated mixed liquor. At the inlet of draft tube/contact duct 195, the D.O. content is about 0.10 mg/l.

Curve 200 in FIG. 20 traces the D.O. content in the channel of the Barrier Oxidation Ditch under the comparison conditions of one MGD flow rate and 200 mg/l $BOD_5$ in the influent wastewater for the Imhoff System, the Rotor Oxidation Ditch, and the Barrier Oxidation Ditch. Curve 200 comprises the end 202 of a slowly declining portion in intake channel 192, a sharply rising portion 203 as the mixed liquor passes through the draft tube and deep oxygen contact duct 195 at a greater depth than channel bottom 191 and beneath barrier 194, and at beginning 204 of the same slowly declining portion as the aerated liquor enters dischage channel 193. Curve 205 represents the F/M ratio in FIG. 20, and Curve 206 represents the MLSS content in the channel of ditch 190.

Measurements of dissolved oxygen oontent were made during 1978 of samples taken from one, four, and seven feet from the bottom of the channel in the barrier oxidation ditch which was designed in accordance with Example I in U.S. Pat. No. 4,260,486. These measurements showed that the D.O. content was uniform from top to bottom at three locations along the endless channel. The D.O. profile is therefore vertically planar in a barrier oxidation ditch.

Figure 14:
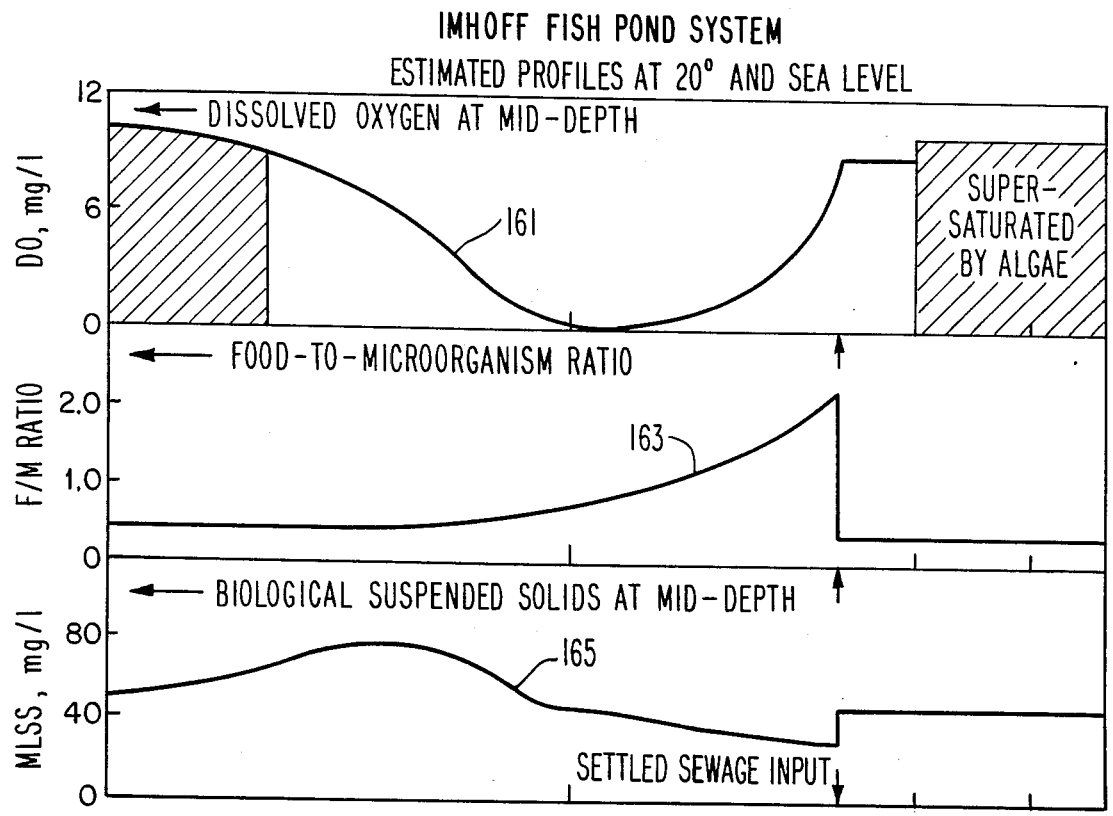
FIG. 14 is a composite graph, corresponding to FIG. 13, of three parameters: Dissolved Oxygen (D.O), Food/Microorganism (F/M) Ratio, and Mixed Liquor Suspended Solids (MLSS) in the Imhoff system.

Comparison of the D.O. curves for the Imhoff system in FIG. 14, the rotor aerator ditch in FIG. 17, and the barrier oxidation ditch in FIG. 20 shows that three systems are radically different and could be expected to have different life-sustaining effects upon their populations of microorganisms with respect to frequency of oxygenation, amount of oxygen transferred, and quantity of oxygen available near their bottoms. The barrier oxidation ditch notably differs from the Imhoff and rotor aerator systems because of the intense mixing that occurs within its deep oxygen contact duct and the state of constant turbulence within its endless channel, so that depth and transverse distance from a side wall are inconsequential as to every known parameter.

Figure 8:
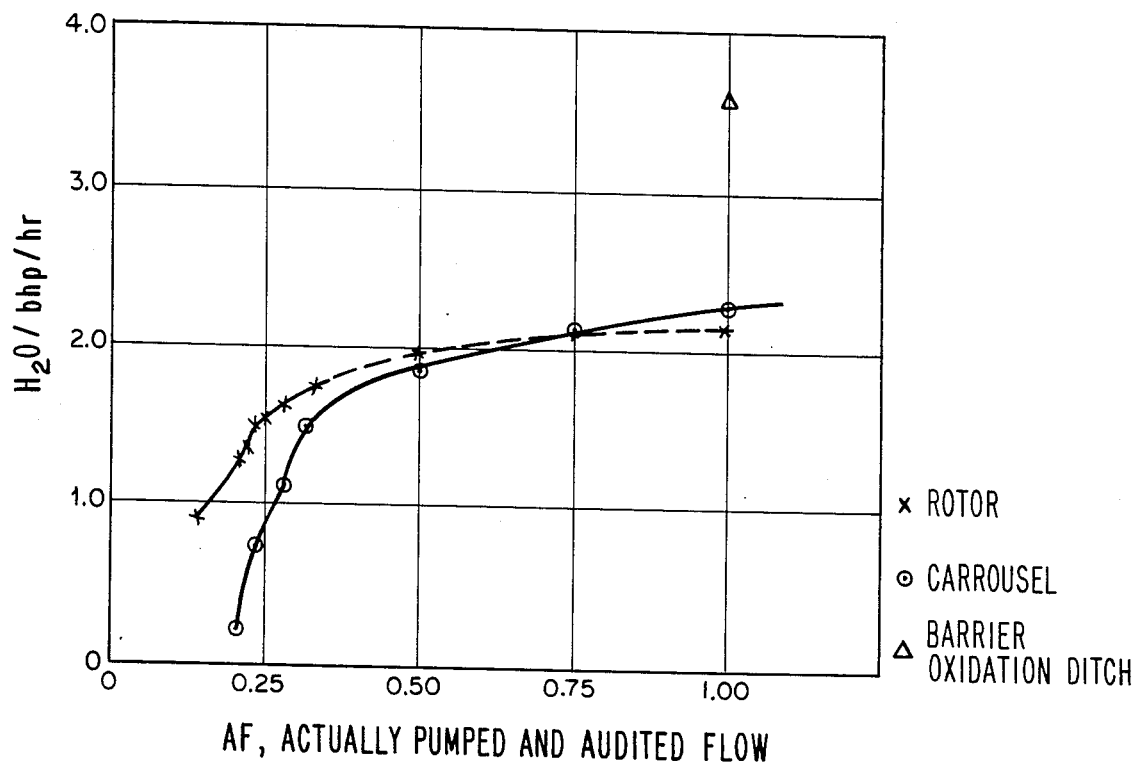
FIG. 8 shows the effects of blending aerated liquor with unaerated liquor within the channels of three types of oxidation ditches on the calculated rate of oxygen transfer efficiency, in pounds of transferred oxygen per hour per brake horsepower, as functions of the fractions of the flow past the pump/aerators that are actually pumped and aerated.
Figure 9:
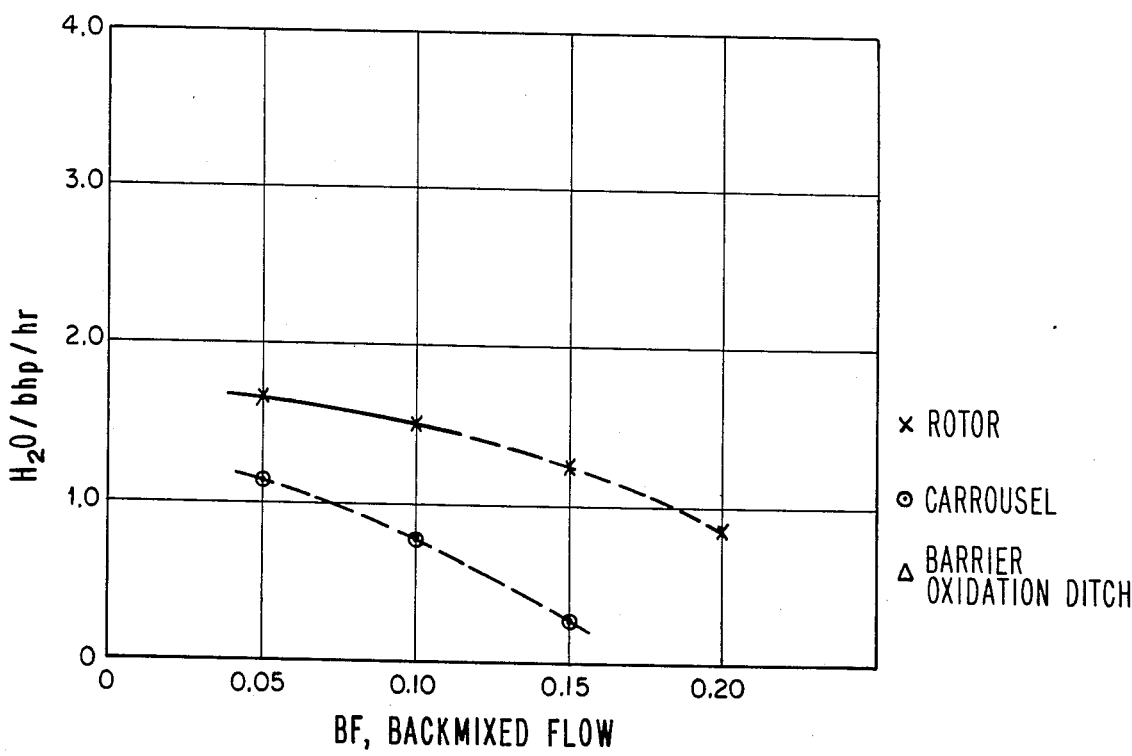
FIG. 9 shows the effect of backmixing within the channels of the same three types of oxidation ditches as seen in FIG. 8 on the calculated rate of oxygen transfer efficiency, in pounds of transferred oxygen per hour per brake horsepower, as functions of the fractions of aerated flow that are backmixed to the pump/aerator of an oxidation ditch.
Figure 10:
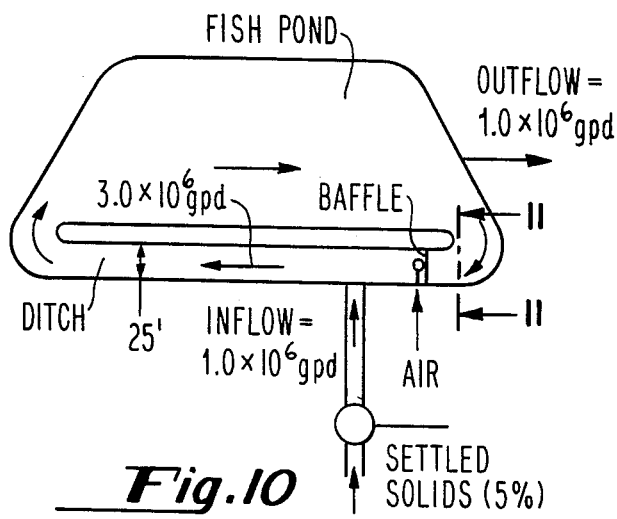
FIG. 10 is a plan view of the aeration pond and circulation ditch of U.S. Pat. No. 1,643,273 of Imhoff.
Figure 11:
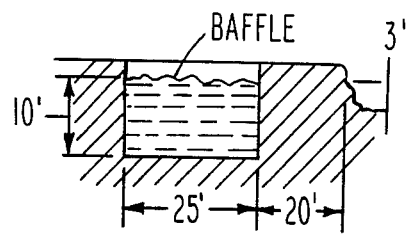
FIG. 11 is a transverse elevation view through the circulation ditch of FIG. 10, looking in the direction of the arrows 11—11 in FIG. 10.
Figure 12:
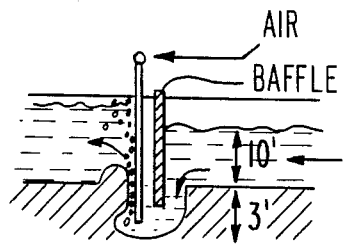
FIG. 12 is a longitudinal sectional elevation view through the airlift pump in the circulation ditch of FIG. 10.
Figure 13:
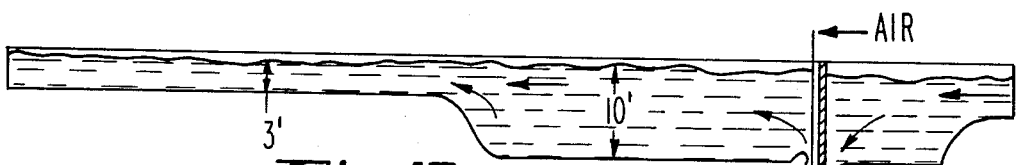
FIG. 13 is a longitudinal sectional elevational view through the entire pond and ditch system of FIG. 10, approximately along the arrows indicating flow directions in FIG. 10, that depicts the entire flow path of the Imhoff system in linear fashion.

Comparison of the pounds of oxygen transferred to mixed liquor per brake horsepower per hour for the rotor aerator oxidation ditch, the Carrousel oxidation ditch, and the barrier oxidation ditch, as given in Table II and as plotted in FIGS. 8 and 9, shows that the oxygen transfer efficiency of the barrier oxidation ditch is not only higher but is also more consistent than the efficiencies of the rotor aerator and Carrousel ditches because it is not subject to backpumping (including backmixing of aerated liquor) and movement of liquor past the pump/aerator by induced flow (in FIG. 8, induced flow=total flow−AF) that produces blending or heterogenous aeration (see FIG. 2).

It is also unfortunately characteristic of both the rotor aerators and the mechanical surface aerators used in the Carrousel ditches that the deeper these aerators are operated, in an attempt to increase either channel velocity or channel dissolved oxygen content (both being interdependent for these aerators), the greater the amount of backmixing of aerated liquor that tends to occur. However, deeper submergence of these surface-type aerating units does tend to decrease the amount of induced flow.

In contrast, the barrier oxidation ditch operates essentially independently of submergence if sufficient power is available to compensate for lower hydrostatic head (see Examples VIII and IX of U.S. Pat. No. 4,260,486, wherein flooding occurred when the liquor level was lowered), and provides control of dissolved oxygen output independently of control of channel velocity (consequently controlling the length of the aerobic zone) while aerating and pumping the liquor.

EXAMPLE IV

In the total barrier oxidation ditch 120, as seen in plan view in FIG. 7, measurements were made of hydraulic heads existing along the outer edge, while the pumps, sparges, and diffusers were in operation, for four operational conditions.

Stations 211–226, indicated by small circles at which level readings were taken, are alongside the outer wall of the ditch in all but three instances.

The level readings were taken by:
(a) forcing a large nail through the center of a hollow-core, varnished wooden door, measuring approximately 2.5 feet by 7 feet, which had been selected in order to dampen surface turbulence in the channel;
(b) impaling the lower end of a wooden surveyor's leveling rod upon the nail;
(c) setting up an engineer's level alongside ditch 120;
(d) holding the door and rod at a station 211–226, generally employing a light rope to overcome the force of the current, while an assistant, acting as rodman, balanced the rod upon the door; and
(e) taking and recording a reading through the level to the nearest one hundredth of a foot.

In numerous instances, particularly at stations 211 and 226 which were 5 feet and 644 feet downstream of the center of barrier 130, respectively, additional readings were taken by one or both assistants. Averaged readings are given in the following Table II for four tests under stated conditions, after assigning a value of 0.00 feet to the lowest reading.

Test No. 1 employed both pumps 126, 127 at low speed with low-pressure air being admitted to their sparges beneath their propellers. Test No. 2 employed both pumps 126, 127 with no air being admitted to their sparges or to the diffusers in the ducts. Test No. 3 employed pump 126 alone, with low-pressure air being admitted to its sparge while pump 127 idled. Test No. 4 employed pump 126 only, with high-pressure air being admitted to its diffusers which are disposed close to the bottom of its deep contact or discharge duct, while pump 127 idled.

Figure 21:
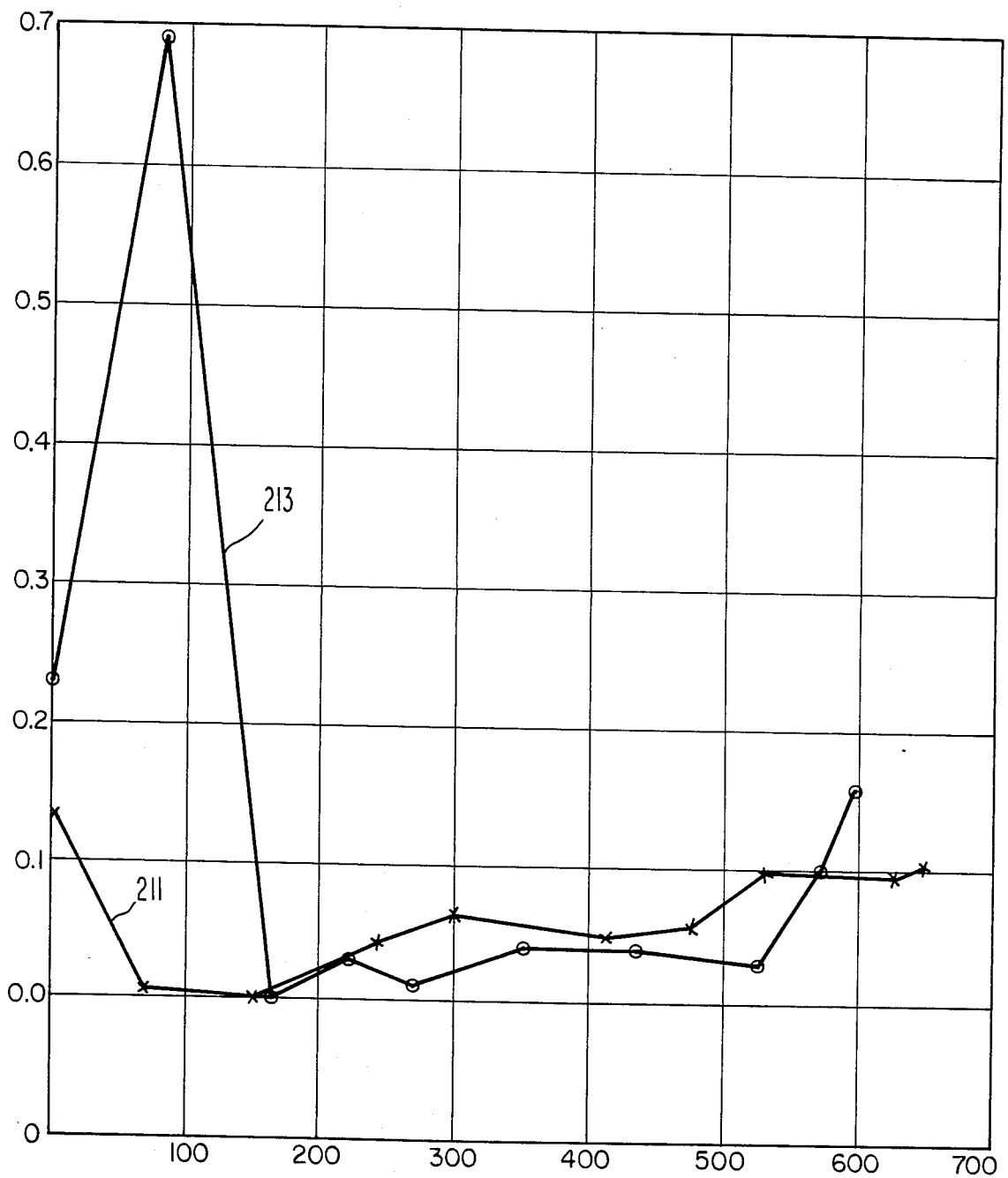
FIG. 21 is a graph of the differential hydraulic heads calculated at the 10 stations shown in the barrier oxidation ditch of FIG. 7, as an average of four operating conditions that were tested with two pump/aerators, and a graph of the differential hydraulic heads calculated at 10 stations in another barrier oxidation ditch having a single pump/aerator and under a single operating condition.

The data in Table III, as averaged in the last column for stations at which at least three readings were recorded, are plotted in FIG. 21 as curve 211 with the centerline of barrier 130 in FIG. 7 being represented by the left side edge of FIG. 21.

duct of an idle pump/aerator if another pump/aerator were in operation.

TABLE III

| | | TEST NO. | | | | |
|---|---|---|---|---|---|---|
| Station No. | Downstream Distance From Center of Barrier, Ft. | 1<br>2 Pumps &<br>2 Low-<br>Pressure<br>Blowers | 2<br>2 Pumps &<br>No Blower | 3<br>1 Pump &<br>1 Low-<br>Pressure<br>Blower | 4<br>1 Pump &<br>1 High-<br>Pressure<br>Blower | Avg. |
| 211 | 5 | 0.09 | 0.19 | 0.13 | 0.13 | 0.14 |
| 212 | 71 | 0.00 | 0.00 | 0.01 | — | 0.00 |
| 213 | 151 | 0.00 | 0.00 | 0.00 | 0.00 | 0.00 |
| 215 | 241 | 0.03 | 0.06 | 0.04 | 0.02 | 0.04 |
| 217 | 300 | 0.05 | 0.10 | 0.04 | — | 0.06 |
| 219 | 412 | — | 0.08 | 0.03 | 0.04 | 0.05 |
| 221 | 476 | 0.09 | 0.07 | 0.03 | 0.04 | 0.06 |
| 223 | 529 | — | 0.14 | 0.07 | 0.08 | 0.10 |
| 225 | 626 | 0.11 | 0.14 | 0.06 | 0.07 | 0.10 |
| 226 | 644 | 0.12 | 0.16 | 0.06 | 0.07 | 0.10 |

Another barrier oxidation ditch, similar to the ditches shown in FIGS. 3–7 and 19 except that it has one 100-HP pump/aerator, was similarly measured for hydraulic head at ten stations and at a single pumping condition, using the same floating door, surveyor's leveling rod, and engineer's level as used to obtain the data in Table III. The resulting data are given in Table IV and are plotted as curve 213 in FIG. 21, with the centerline of its barrier also being represented by the left side edge of FIG. 21.

TABLE IV

| Distance Downstream, Ft. | Differential Head Above Lowest Measured Hydraulic Head, Ft. |
|---|---|
| 5 | 0.23 |
| 86 | 0.69 |
| 166 | 0.00 |
| 221 | 0.03 |
| 270 | 0.01 |
| 354 | 0.04 |
| 438 | 0.04 |
| 527 | 0.03 |
| 573 | 0.10 |
| 597 | 0.16 |

The differential heads plotted in FIG. 21 as curves 211, 213 indicate that there was a steadily increasing pile-up of liquor in the endless channel through nearly 500 feet preceeding barrier 130, thereby indicating that the barrier indeed functioned as a dam, contrary to the belief expressed in column 11, lines 23–27 of U.S. Pat. No. 4,260,486. Moreover, the hydraulic grade line at the successive stations indicate that the water-surface elevation dropped as would be expected, from the downstream side of the barrier to the middle of the first bend of the ditch shown in FIG. 7. Then, instead of continuing to drop, the hydraulic grade line began to build up for each of the tests with nearness to the barrier. Yet, head measurements at Stations 211 and 226, straddling the barrier, revealed the following differential hydraulic heads: −0.03 feet for Test No. 1; +0.02 feet for Test No. 2; +0.07 feet for Test No. 3; and +0.05 feet for Test No. 4.

Such a pile-up of liquor against barrier 130 in FIG. 7 should exert pressure against it and cause flow to be created or induced past the barrier if any opening should be made therethrough, such as the slidable gateways in FIG. 32 or the pivotable gateway in FIG. 50 of U.S. Pat. No. 4,278,547. Such induced flow would also be expected to move through a deep oxygen contact

EXAMPLE V

Figure 22:
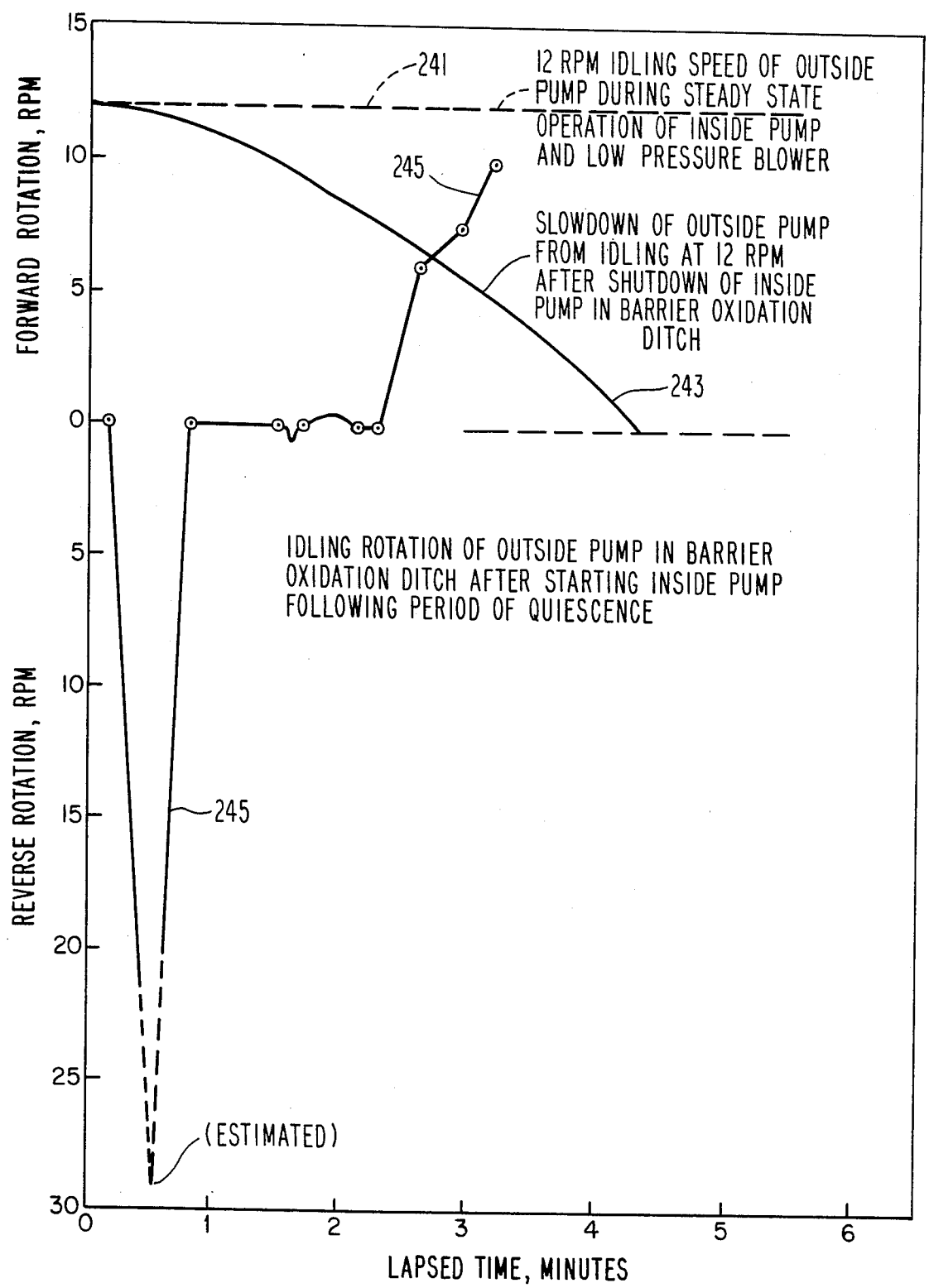
FIG. 22 is a composite graph of idling rotational speeds for the outside pump of the barrier oxidation ditch shown in FIG. 7 while the inside pump is or has been in use.

Immediately following the tests summarized in Table III and under conditions reproducing Test No. 3, the idling speed of outer pump 127 was measured with a stopwatch while inner pump 126 operated with low-pressure air being admitted to its sparge, beneath its impeller. The idling speed was found to be about 12 rpm in the forward direction as represented by broken line 241 in FIG. 22, thereby providing an indication of the amount of induced flow that was leaving the discharge end of deep oxygen contact duct 132. While pump 126 was idling, triplicate differential hydraulic head readings, made by three observers at stations 211 and 226, provided an average differential hydraulic head across barrier 130 of +0.07 feet (the head was higher on the downstream side at station 211 than on the upstream side at station 226.)

Five measurements of the flow velocity within the intake channel were then made over a 55-foot distance. The average velocity was 1.47 feet±0.23 feet per second, within 95 percent confidence limits.

Then both pumps 126, 127 were shut down. Slowdown of pump 127 was measured with a stopwatch and is shown as curve 243 in FIG. 22. After the mixed liquor had become quiescent, settling data were taken, and the depth at station 225 alongside walkway 136 and pump aerator 127 was measured to be 128 inches of quiescent mixed liquor. A laboratory test of a mixed liquor sample, taken about two days earlier, indicated that it contained 1,060 mg/l of suspended solids when in translational flow.

Then inner pump 126 was started again, and its low-pressure blower was also started five seconds later while idling measurements were again taken on outer pump 127, reproducing Test No. 3 after steady-state conditions had been reached. Inner pump 127 briefly reversed quite rapidly, stopped, and then began to rotate again in the forward direction. Stopwatch measurements were made, as shown by curve 245, of the idling rotation of pump 127. These idling measurements appear to indicate that there was considerable kinetic energy in the moving mass of mixed liquor, thereby again demonstrating that the barrier was functioning as a dam.

Nevertheless, a barriered pump/aerator is believed to provide increased overall efficiency because it completely prevents backpumping of liquor, backmixing of aerated liquor, and induced flow past the pump/aerator, whereby all of the flowing mixed liquor and an oxygen-containing gas are brought into singly occurring contact under a hydrostatic head that is considerably greater than the channel depth. The system is consequently characterized by point-source homogeneous aeration, in contrast to multi-source heterogeneous aeration in wastewater treatment systems of the prior art.

EXAMPLE VI

A barrier oxidation ditch, described and designed as in Example I of U.S. Pat. No. 4,260,486 which is incorporated herein by reference, was sampled and measured during April 17 through 21 of its first year of operation at Stations A, B, C, and E which were respectively about 25, 155, 31, and 597 feet downstream from the middle of the barrier. The midstream of the channel was 622 feet in length, including the thickness of the barrier.

Specifically, velocities in the channel were measured in feet per second at Stations A, C, and E with the following results:

| | | Velocity, ft./sec. | | |
|---|---|---|---|---|
| | Conditions | A | C | E |
| (1) | Both pump/aerators and both compressors in operation | 1.48 | 1.40 | 1.18 |
| (2) | One pump/aerator and one compressor in operation | 0.82 | 0.47 | 0.43 |
| (3) | Both pumps in operation but no compressors | 1.58 | 1.32 | 1.22 |
| (4) | One pump in operation but no compressors | 0.82 | 0.57 | 0.35 |

Samples were taken at one, four, and seven feet from the bottom of the channel at Stations A, B, and C. The D.O. readings at all three depths were identical for each location; no stratification was observed. In consequence, it may accurately be stated that planar D.O. profiles were measured. The results were as follows at three stations and at two operating conditions:

| | | Dissolved Oxygen, mg/l | | |
|---|---|---|---|---|
| | Conditions | A | B | C |
| (1) | Both pump/aerators and both compressors in operation | 1.0 | 0.6 | 0.0 |
| (2) | One pump/aerator and one compressor in operation | 0.4 | 0.2 | 0.0 |

One sludge sample and 24 samples of mixed liquor were removed from the channel and analyzed by APHA analysis methods. The sludge sample was found to contain 3.3 percent solids.

Two sampling series; as composites from three different depths, were taken for analysis, with the results shown in the following tables in which "Total BOD" represents an average of three single determinations of samples from each depth, "Total COD" also represents an average of three single determinations from each depth, and "Total Nitrogen" was calculated as the sum of $TKN + NO_2 + NO_3$:

| | Series I | | |
|---|---|---|---|
| Parameters | A-1 | C-1 | E-1 |
| Total BOD, mg/l | 3,240 | 3,120 | 3,360 |
| Soluble BOD, mg/l | 70 | 84 | 86 |
| Total Suspended Solids, mg/l | 3,410 | 3,445. | 3,199 |
| Total COD, mg/l | 4,335 | 4,240 | 4,100 |
| Soluble COD, mg/l | 199 | 90 | 83 |
| pH | 6.4 | 6.8 | 6.3 |
| Ammonia Nitrogen, mg/l | 16.0 | 18.0 | 19.5 |
| Total Phosphorus, mg/l | 50 | 59 | 50 |
| Volatile Soluble Solids, mg/l | 3,225 | 3,025 | 3,005 |
| Nitrate, mg/l | 1.42 | 1.44 | 0.98 |

| | Series II | | |
|---|---|---|---|
| Parameters | A-2 | C-2 | E-2 |
| Total BOD, mg/l | 3,720 | 3,780 | 3,300 |
| Soluble BOD, mg/l | 78 | 86 | 78 |
| Total Suspended Solids, mg/l | 3,290 | 3,085 | 3,220 |
| Total COD, mg/l | 3,462 | 2,528 | 4,099 |
| Soluble COD, mg/l | 109 | 98 | 94 |
| pH | 6.5 | 6.3 | 6.5 |
| Ammonia Nitrogen, mg/l | 19.5 | 16.0 | 19.5 |
| Total Phosphorus, mg/l | 52 | 57 | 62 |
| Volatile Soluble Solids, mg/l | 3,025 | 3,045 | 2,950 |
| Nitrate, mg/l | 1.41 | 1.49 | 1.58 |

In addition, 24-hour composites were taken on 20–21 of April and 21–22 of April of the Influent and Discharge of the Barrier Oxidation Ditch. These composites were analyzed with the following results:

| | Influent | | Discharge | |
|---|---|---|---|---|
| Parameters | 4/20–21 | 4/21–22 | 4/20–21 | 4/21–22 |
| BOD-5, mg/l | 930 | 930 | 68 | 840 |
| TSS, mg/l | 194 | 412 | 17 | 550 |
| COD, mg/l | 1,156 | 802 | 1,100 | 754 |
| TKN, mg/l | 84.8 | 77.6 | 6.2 | 37.4 |
| Ammonia Nitrogen, mg/l | 45.0 | 44.0 | 0.7 | 1.6 |
| Total Phosphorus, mg/l | 21 | 22 | 9 | 16 |
| VSS, mg/l | 128 | 230 | 11 | 276 |
| Nitrate, mg/l | 0.36 | 0.31 | 0.52 | 0.35 |
| Nitrite, mg/l | 0.01 | 0.01 | 0.01 | 0.01 |
| Sulfate, mg/l | 1.0 | 11.3 | 17.8 | 20.4 |
| Sulfide, mg/l | — | — | — | — |
| Total Nitrogen (calc.) | 85.16 | 77.91 | 6.72 | 1.95 |

Inadequate clarifier capacity is shown by the high TSS level in the discharge on the second day. However, the low levels of ammonia nitrogen clearly show the nitrification capacity of the system, and the very low $NO_3$ and $NO_2$ levels indicate its denitrification capabilities.

EXAMPLE VII

In a total barrier oxidation ditch having a down-pumping axial-flow pump/aerator, the horsepower of the motor driving the propellor may be selected over a wide range. The higher the horsepower, the more liquor is pumped, the more air can also be pumped downwardly, and the lower is the ratio of liquor to air. The following table presents typical power and capacity relationships that are available to the designer of a barrier oxidation ditch having a 72-inch diameter draft tube and a sparge that is disposed beneath the propellors and at a depth of 108 inches:

| Motor HP | Liquid Pumped, cfs | Pumped, cfm | Air Pumped, scfm | Liquid/Air Vol. Ratio @ Std. Cond. |
|---|---|---|---|---|
| 25 | 165 | 9,900 | 290 | 34.1 |
| 30 | 175 | 10,500 | 350 | 30.0 |
| 40 | 195 | 11,700 | 440 | 26.6 |
| 50 | 210 | 12,600 | 520 | 24.2 |
| 60 | 220 | 13,200 | 620 | 21.3 |
| 75 | 245 | 14,700 | 750 | 19.6 |
| 100 | 265 | 15,900 | 900 | 17.7 |

-continued

| Motor HP | Liquid Pumped, cfs | Air Pumped, cfm | Liquid/Air Vol. Ratio @ Std. Cond. |
|---|---|---|---|
| 125 | 290 | 17,400 | 1,000 | 17.4 |

It would seem that choosing a large motor would furnish every advantage, but a designer would be very well aware that each additional horsepower adds to operational costs, pumping additional liquid increases the speed of liquid flow through the channel beyond the flow rate of about 1.0 feet per second needed to maintain the solids in suspension, and producing a liquid/air volumetric ratio that is greater than needed can create more dissolved oxygen in the discharge channel than the microorganisms can consume and can thereby make denitrification impossible to achieve.

What is of overriding importance, however, is the requirement that the velocity of downwardly pumping the liquid/air mixture be sufficiently high that the mixture will reach the discharge level (at the bottom of the deep oxygen contact duct) before coalesence of the air bubbles becomes sufficiently great that enlarged air bubbles will rise against the downwardly moving column of the liquor/air mixture and flood the propellor. As demonstrated in Examples VIII-X of U.S. Pat. No. 4,260,486, the operating conditions can be so delicately balanced that varying the sparge submergence depth by 1.25 feet can cause flooding.

Rates of bubble rise at various bubble sizes are given in the following table, but the rates of bubble coalesence are not known with precision:

| Rise Velocity of Air Bubbles in Water at 20° C. | |
|---|---|
| Equivalent Diameter, cm. | Velocity, cm/sec. |
| 0.03 | 2.9 |
| 0.06 | 6.9 |
| 0.10 | 19 |
| 0.15 | 34 |
| 0.20 | 30 |
| 0.30 | 30 |
| 0.40 | 27 |
| 0.60 | 27 |
| 1.0 | 24 |
| 1.5 | 27 |
| 2.0 | 29 |
| 3.0 | 37 |
| 4.0 | 44 |
| 6.0 | 56 |

If the designer must consider merely a downward pumping distance that extends through the draft tube from the liquor surface to a short distance above the bottom of a complete-mix basin, as in prior art practices, the coalesence problem is almost non-existent. But when the length of the draft tube is augmented by the length, to its bottom, of a J-shaped or U-shaped deep oxygen contact duct, the problem becomes very significant, requiring a balance between minimum power requirements and D.O. and pumping requirements.

It is further important that the sparge depth in complete mix basins is conventionally at about one-half of the total depth. When the liquor/air mixture escapes from the bottom of the relatively short downdraft tube which is close to the bottom of the basin, the liquor/air mixture escapes laterally and almost explosively in all directions so that coalesence of air bubbles creates no difficulty because they rise in an open tank rather than in the downdraft tubes. This situation can be contrasted to prolonged downpumping of the liquor/air mixture that is required in the deep oxygen contact duct of this invention.

Because it will be readily apparent to those skilled in the art that innumerable variations, modifications, applications, and extensions of these embodiments and principles can be made without departing from the spirit and scope of the invention, what is herein defined as such scope and is desired to be protected should be measured, and the invention should be limited, only by the following claims.

What is claimed is:

1. A wastewater treatment process for operating a closed loop reactor, comprising an endless channel which has a bottom and sides and contains mixed liquor which is translationally flowing in a downstream direction through a plurality of cycles throughout its length, to provide aerobic treatment to a continuous incoming stream of wastewater by the activated sludge process, said wastewater treatment process comprising the following steps which occur during each cycle of said mixed liquor through said endless channel:
  A. at a depth above said bottom, continuously pumping all of said mixed liquor downwardly;
  B. at a depth above said bottom, continuously mixing an independently controlled stream of dispersed air with said downwardly pumped mixed liquor to form a liquor-air mixture within which oxygen is transferred from said dispersed air to said liquor;
  C. continuously guiding said pumped liquor-air mixture to a depth below said bottom in order to create concentrated power input per unit volume of said liquor-air mixture and to increase air dissolution pressure, oxygen solubility, and oxygen transfer rate at maximum contact depth and hydrostatic pressure under conditions of high mixing turbulence;
  D. continuously returning said pumped liquor-air mixture to said channel at a location downstream of said pumping while discharging said mixture in said downstream direction, whereby:
    (1) pumping capacity remains relatively constant while oxygen supply and dissolved oxygen content of said aerated mixed liquor can be varied at will and
    (2) a completely mixed plug flow system is created in which solid suspension can be selectively increased and in which oxygen transfer efficiency is improved.

2. The wastewater treatment process of claim 1 which further comprises dividing said translationally flowing mixed liquor into upstream liquor within an intake channel and downstream liquor within a discharge channel, said continuously mixing of said Paragraph B and said continuously pumping of said Paragraph A occurring near the bottom of said intake channel and said continuously returning of said Paragraph D occurring within said discharge channel.

3. The wastewater treatment process of claim 2, wherein said oxygen being transferred within said liquor-air mixture, from said dispersed air to said liquor, forms a homogeneously aerated mixed liquor which constitutes the entirety of said downstream liquor after said returning within said discharge channel.

4. The wastewater treatment process of claim 3, wherein backmixing of said aerated mixed liquor to said intake channel is completely prevented.

5. The wastewater treatment process of claim 4, wherein preventing said backmixing, maintaining said homogeneous aeration, maintaining the lowest possible aerator intake liquor dissolved oxygen concentration, and utilizing said hydrostatic pressure and said concentrated power input per unit volume during said pumping increase the oxygen transfer driving force during said mixing and said returning, thereby decreasing the energy required for dissolving a given quantity of oxygen in the mixed liquor and increasing the oxygen transfer efficiency of said process.

6. The wastewater treatment process of claim 4, wherein independent control of the supply of said stream of dispersed air to said mixing and substantially independent control of said pumping provides a means to match power consumption with oxygen demand and to vary the lengths and volumes of aerobic and anoxic zones within said endless channel for maintaining a very low intake dissolved oxygen concentration of 0–0.3 mg/l to improve oxygen transfer efficiency and selectively to accomplish combined nitrification and denitrification of said wastewater.

7. An activated sludge process for aerobically treating wastewater being fed into a volume of mixed liquor which is flowing continuously and translationally at a selected velocity through an endless channel of substantially uniform cross-section, without interruption by a pond or baffles, said treating comprising the following steps:
  A. dividing said mixed liquor into upstream liquor within an intake channel and downstream liquor within a discharge channel;
  B. continuously pumping all of said upstream liquor downwardly from said intake channel, so that no flow is induced flow that is moving past said pump, and generating pressures upon said upstream liquor that are greater than the hydrostatic pressure at the bottom of said endless channel;
  C. introducing a dispersed oxygen-containing gas into said pumped upstream liquor in order to:
    (1) form a liquor-gas mixture which is subject to said generated pressures, whereby oxygen is transferred within said liquor-gas mixture, from said dispersed gas to said liquor,
    (2) create concentrated power input per unit volume of said liquor-gas mixture, and
    (3) increase air dissolution pressure, oxygen solubility, and oxygen transfer rate at maximum contact depth and hydrostatic pressure under conditions of high mixing turbulence; and
  D. discharging said liquor-gas mixture into said discharge channel to form a homogeneously aerated mixed liquor therewithin as said downstream liquor while preventing backmixing of said aerated mixed liquor to said intake channel and preventing blending of aerated mixed liquor with unaerated mixed liquor, moving as said induced flow.

8. The process of claim 7, wherein said velocity of said translationally flowing mixed liquor is controllable over a wide range and said aerating is independently controllable so that the dissolved-oxygen content of said aerated mixed liquor can also be varied over a wide range, independently of said velocity.

9. The process of claim 8, wherein said endless channel contains an aerobic zone and an anoxic zone therewithin and said variable controllability of said velocity and said independently variable controllability of said aerating provide a means for controlling the lengths and volumes of said aerobic and anoxic zones.

10. In an activated process for aerobically treating a continuous stream of wastewater by continuously admixing said stream with a quantity of circulating mixed liquor which:
  (1) contains a biomass that selectively includes purely aerobic heterotrophic bacteria for oxidizing biochemical oxygen demand (BOD), facultative aerobic heterotrophic bacteria as denitrifiers which oxidize said BOD with either dissolved oxygen or chemically bound oxygen, purely aerobic autotrophic bacteria as nitrifiers, and facultative autotrophic bacteria as $H_2S$ or $NH_3$ oxidizers which exist at least partially as a bacterial floc and for which said wastewater is a food source at a food-to-microorganism ratio by weight varying over a range of 0.01 to 2.5,
  (2) flows translationally within the endless channel of an oxidation ditch at a circulation velocity that is sufficient to maintain said floc in an adequately mixed state of suspension therewithin, without interruption by a clarification zone within said channel, so that said admixing occurs during each circuit-flow cycle of said mixed liquor within said endless channel, said channel having a bottom and containing an aerobic zone and an anoxic zone,
  (3) is diminished by a portion thereof being continuously discharged to a settling means for separating clarified liquor from settled sludge, and
  (4) is increased by at least a part of said settled sludge being continuously returned to said channel,
the improvement comprising the following steps:
(A) dividing said mixed liquor and said channel into upstream liquor within an intake channel and downstream liquor within a discharge channel;
(B) connecting said upstream liquor to said downstream liquor through at least one deep oxygen contact duct which functions as an overpressure duct at a hydrostatic pressure greater than the pressure at said bottom;
(C) pumping all of said upstream liquor downwardly into and through said discharge duct from said intake channel to said discharge channel to create conditions of high mixing turbulence at said hydrostatic pressure; and
(D) at a depth above said bottom, introducing compressed air to said all of said pumped upstream liquor entering said discharge duct in order to:
  (1) form a liquor-air mixture, comprising air bubbles, within said contact duct while creating concentrated power input per unit volume of said liquor-air mixture at said hydrostatic pressure,
  (2) transfer oxygen from said air bubbles to said all of said mixed liquor within said liquor-air mixture to form an aerated mixed liquor as said downstream liquor,
  (3) completely prevent backmixing of said aerated mixed liquor to said intake channel and blending of aerated mixed liquor with unaerated mixed liquor, and
  (4) increase the oxygen transfer driving force within said deep oxygen contact duct, thereby decreasing the energy required for dissolving a given quantity of oxygen in said mixed liquor and increasing the oxygen transfer efficiency while providing said aerobic treatment to said all of said mixed liquor within said endless channel and translationally circulating said mixed liquor at said sufficient circulation velocity to maintain said bacterial floc in said state of suspension.

11. The improved activated sludge process of claim 10, wherein said food-to-microorganism ratio varies over the range of 0.01 to 1.0 and said mixed liquor has at least 1,000 mg/l of mixed liquor suspended solids, whereby said oxidation ditch operates as an extended aeration system.

12. The improved activated sludge process of claim 11, wherein said pumping utilizes an axial-flow pump, comprising a down-flow impeller and an intake funnel, which is disposed above said impeller and in flow connection with said upstream liquor.

13. The improved activated sludge process of claim 12, wherein said introducing of compressed air utilizes at least one shallow sparge device which is disposed below said down-flow impeller.

14. The improved activated sludge process of claim 13, wherein a plurality of said axial-flow pumps, said sparge rings, and said deep oxygen contact ducts are provided and wherein said introducing of compressed air further utilizes at least one deep diffuser device which is removably disposed within each said deep oxygen contact duct.

15. The improved activated sludge process of claim 14, wherein by varying the proportion of said compressed air fed to each said sparge ring and each said diffuser device within said contact duct, said velocity can be selectively varied.

16. The improved activated sludge process of claim 15, wherein said oxidation ditch is selectively operable:
A. to provide aerobic and anoxic zones within said channel for combined nitrification and denitrification of said wastewater; and
B. to vary the lengths and volumes of said aerobic and anoxic zones in accordance with variations in pollutant loading and seasonal temperature changes.

17. The improved activated sludge process of claim 16, wherein said oxidation ditch is selectively operable by varying:
A. the operation of said impellers singly or in parallel,
B. the speeds of said impellers,
C. the total amount of said compressed air, and
D. the proportion of said compressed air between said shallow sparge devices and said deep diffusion devices, whereby:
(1) said velocity is variable over a range of from 0.5 ft/sec. to at least 3.0 ft/sec. while maintaining a selected dissolved-oxygen output from said discharge ducts, or
(2) said dissolved-oxygen output is variable while maintaining a selected velocity, or
(3) both said velocity and said dissolved-oxygen output are variable in selected combinations while operating all said impellers at a constant speed.

18. The improved activated sludge process of claim 17, wherein said continuous stream of wastewater is delivered to said channel within said anoxic zone and upstream of said intake channel in order to enable certain of said microorganisms, that are present in said anoxic zone and use nitrate oxygen as their oxygen source and hydrogen sulfide as their energy source, to maximize denitrification and to minimize consumption of free dissolved oxygen for chemical and biological oxidation of said hydrogen sulfide, thereby enabling said free dissolved oxygen to be used to a maximum extent for biological BOD removal and nitrification, by utilizing nitrate oxygen that is available in said circulating mixed liquor for oxidation of said hydrogen sulfide that is present in said continuous stream of wastewater.

19. The improved activated sludge process of claim 18, wherein said anoxic zone is at an anoxic level of about 0.50 mg/l or less of dissolved oxygen.

20. The improved activated sludge process of claim 10, wherein said returned part of said settled sludge enters said intake end of said deep oxygen contact duct.

21. The improved activated sludge process of claim 10, wherein at least a portion of said deep oxygen contact duct is at a greater depth than the depth of said discharge channel.

22. The improved activated sludge process of claim 21, wherein said deep oxygen contact duct is extended at said greater depth for a sufficient distance that substantially all of said aerobic treatment with dissolved oxygen occurs within said discharge duct and under a selected hydrostatic pressure that is greater than the pressure corresponding to said depth of said discharge channel.

* * * * *